(12) United States Patent
Okita et al.

(10) Patent No.: US 10,551,817 B2
(45) Date of Patent: Feb. 4, 2020

(54) DEVICE AND METHOD OF CONTROLLING MACHINE TOOL, TO CONTROL SYNCHRONIZED OPERATION OF SPINDLE AXIS AND FEED AXIS

(71) Applicant: FANUC CORPORATION, Yamanashi (JP)

(72) Inventors: Tadashi Okita, Yamanashi (JP); Yuuki Morita, Yamanashi (JP); Daisuke Tajima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 74 days.

(21) Appl. No.: 15/878,743

(22) Filed: Jan. 24, 2018

(65) Prior Publication Data

US 2018/0210417 A1    Jul. 26, 2018

(30) Foreign Application Priority Data

Jan. 25, 2017  (JP) .................................. 2017-011455

(51) Int. Cl.
  *G05B 19/402*  (2006.01)
  *G05B 19/414*  (2006.01)
  *G05B 19/416*  (2006.01)

(52) U.S. Cl.
  CPC .. *G05B 19/402* (2013.01); *G05B 2219/43137* (2013.01); *G05B 2219/43177* (2013.01)

(58) Field of Classification Search
  CPC .............. G05B 19/402; G05B 19/4141; G05B 2219/43137; G05B 2219/43177; G05B 2219/50218
  See application file for complete search history.

(56) References Cited

U.S. PATENT DOCUMENTS

| 4,374,350 | A | * | 2/1983 | Kohzai | ................. | G05B 19/39 318/590 |
| 6,543,760 | B1 | * | 4/2003 | Andren | ................. | B65H 3/063 271/112 |
| 2015/0205282 | A1 | * | 7/2015 | Tezuka | ................. | G05B 19/182 700/160 |

FOREIGN PATENT DOCUMENTS

| CN | 106020130 A | 10/2016 |
| CN | 106239257 A | 12/2016 |
| JP | S62-2875 A | 1/1987 |
| JP | 2629729 B2 | 7/1997 |
| JP | H10-78810 A | 3/1998 |

(Continued)

*Primary Examiner* — Thomas C Lee
*Assistant Examiner* — Anzuman Sharmin
(74) *Attorney, Agent, or Firm* — Hauptman Ham, LLP

(57) ABSTRACT

A controller controlling a synchronized operation of spindle and feed axes. The controller is configured to make a spindle axis perform an accelerated rotation at maximum capacity from a starting position aiming at a maximum rotation speed; detect a maximum acceleration of the spindle axis; detect a residual rotation amount of the spindle axis; detect a current speed of the spindle axis; and execute a position control for making the spindle axis perform a decelerated rotation so as to reach a target position, after the accelerated rotation at maximum capacity. The controller is further configured to make the spindle axis perform the decelerated rotation at a positioning deceleration higher than a deceleration corresponding to the maximum acceleration and equal to or lower than a maximum deceleration capable of compensating for a mechanical loss in a drive source during the decelerated rotation of the spindle axis.

12 Claims, 14 Drawing Sheets

(56) References Cited

FOREIGN PATENT DOCUMENTS

| JP | 2004-141991 | A |   | 5/2004 |            |
|----|-------------|---|---|--------|------------|
| JP | 3553741     | B2|   | 8/2004 |            |
| JP | 2016078223  | A |   | 5/2016 |            |
| JP | 2017-1103   | A |   | 1/2017 |            |
| JP | 2017001103  | A | * | 1/2017 | ......... G05B 19/4141 |

* cited by examiner

DEVICE AND METHOD OF CONTROLLING MACHINE TOOL, TO CONTROL SYNCHRONIZED OPERATION OF SPINDLE AXIS AND FEED AXIS

BACKGROUND OF THE INVENTION

1. Field of the Invention

The present invention relates to a device of controlling a machine tool, to control a synchronized operation of a spindle axis and a feed axis. The present invention also relates to a method of controlling a machine tool, to control a synchronized operation of a spindle axis and a feed axis.

2. Description of the Related Art

In a machine tool capable of performing a tapping process by a synchronized operation of a spindle (or principal) axis and a feed axis, various kinds of configurations for improving processing accuracy and reducing cycle time have been proposed. For example, a thread forming apparatus that performs a tapping process by operating a feed axis to follow the rotation of a spindle axis has been known, in which a feed command value for the feed axis is computed based on the rotational speed and rotational acceleration of the spindle axis and a thread pitch, and the feed command value is corrected in accordance with the actual rotational position of the spindle axis, so as to improve tapping accuracy (see, e.g., Japanese Patent No. 2629729 (JP 2629729 B)). On the other hand, a method of acceleration and deceleration control of a spindle motor, executed by a numerical control unit that performs synchronization control of a spindle axis and a feed axis for a tapping process, has been known, in which the numerical control unit prepares an acceleration and deceleration command in conformity with the power characteristics of the spindle axis, and controls the spindle axis based on the acceleration and deceleration command to improve the response of the spindle axis, so as to reduce cycle time (see, e.g., Japanese Patent No. 3553741 (JP 3553741 B)).

Further, a controller of a machine tool, having a configuration for controlling a synchronized operation of a spindle axis and a feed axis, has been known, wherein a numerical control section sends a spindle-axis command to the spindle-axis control section, based on a tapping program, the spindle-axis command including a total rotation amount and a maximum rotation speed of the spindle axis during a period when the spindle axis operates from a process start position to a target thread depth, and a spindle-axis control section makes the spindle axis automatically perform an accelerated and decelerated rotation at maximum capacity in accordance with the spindle-axis command, so as to perform a tapping process (see, e.g., Japanese Unexamined Patent Publication No. 2016-078223 (JP 2016-078223 A)).

SUMMARY OF THE INVENTION

In a machine tool capable of performing a tapping process by a synchronized operation of a spindle axis and a feed axis, cycle time is generally determined depending on the acceleration capacity of the spindle axis. In a configuration in which the cycle time is reduced by controlling the spindle axis so as to maximize the acceleration capacity thereof, there is concern that, during a period when the spindle axis is decelerated by a position control to reach a target position after acceleration, it becomes difficult to make the spindle axis perform a decelerated rotation at maximum capacity due to a mechanical loss caused in a drive source.

One aspect of the present disclosure provides a controller of a machine tool, configured to control a synchronized operation of a spindle axis and a feed axis, the controller comprising a numerical control section configured to prepare a spindle-axis command and a feed-axis command based on a tapping program; a spindle-axis control section configured to control a rotational motion of the spindle axis in accordance with the spindle-axis command; a rotation detecting section configured to detect a rotational position of the spindle axis; and a feed-axis control section configured to control a feed motion of the feed axis in accordance with the feed-axis command, based on the rotational position. The numerical control section comprises a spindle-axis command outputting section configured to obtain, from the tapping program, a total rotation amount and a maximum rotation speed of the spindle axis during a period when the spindle axis operates from a starting position to a target position, and to send the total rotation amount and the maximum rotation speed as the spindle-axis command to the spindle-axis control section. The spindle-axis control section comprises an initial-motion control section configured to make the spindle axis perform an accelerated rotation at maximum capacity using a maximum permissible current of a drive source from the starting position, by a velocity control in which the maximum rotation speed is set as a target value; a maximum-acceleration detecting section configured to detect a maximum acceleration of the spindle axis during the accelerated rotation at maximum capacity, based on the rotational position; a residual rotation-amount detecting section configured to detect a residual rotation amount of the spindle axis during a period when the spindle axis operates from a current position to the target position, based on the total rotation amount and the rotational position; a current-speed detecting section configured to detect a current speed of the spindle axis based on the rotational position; and a positioning-motion control section configured to execute a position control for making the spindle axis perform a decelerated rotation so as to reach the target position, based on the maximum acceleration, the residual rotation amount and the current speed, after the accelerated rotation at maximum capacity. The positioning-motion control section is configured to make the spindle axis perform the decelerated rotation at a positioning deceleration higher than a deceleration corresponding to the maximum acceleration and equal to or lower than a maximum deceleration capable of compensating for a mechanical loss in the drive source during the decelerated rotation of the spindle axis.

Another aspect of the present disclosure provides a method of controlling a machine tool, configured to control a synchronized operation of a spindle axis and a feed axis, the method comprising the steps, executed by a controller, of obtaining, from a tapping program, a total rotation amount and a maximum rotation speed of the spindle axis during a period when the spindle axis operates from a starting position to a target position; making the spindle axis perform an accelerated rotation at maximum capacity using a maximum permissible current of a drive source from the starting position, by a velocity control in which the maximum rotation speed is set as a target value; detecting a maximum acceleration of the spindle axis during the accelerated rotation at maximum capacity, based on a rotational position feedback of the spindle axis; detecting a residual rotation amount of the spindle axis during a period when the spindle axis operates from a current position to the target position, based on the total rotation amount and the rotational position feedback; detecting a current speed of the spindle axis based on the rotational position feedback; and executing a position control for making the spindle axis perform a decelerated rotation so as to reach the target position, based on the maximum acceleration, the residual rotation amount and the current speed, after the accelerated rotation at maximum capacity. The step for making the spindle axis reach the target position includes making the spindle axis perform the decelerated rotation at a positioning deceleration higher than a deceleration corresponding to the maximum acceleration and equal to or lower than a maximum deceleration capable of compensating for a mechanical loss in the drive source during the decelerated rotation of the spindle axis.

The controller according to one aspect has a configuration wherein, when the spindle axis performs the rotational motion from the starting position to the target position, the numerical control section instructs only the total rotation amount and the maximum rotation speed, of the spindle axis, as the spindle axis command to the spindle-axis control section, and the spindle-axis control section performs, in accordance with the spindle axis command, the rotational motion by accelerating the spindle axis with the maximum power using the maximum permissible current, aiming at the maximum rotation speed, and continuously performs, based on the maximum acceleration detected during the maximum accelerated rotation as well as the sequentially detected residual rotation amount and current speed of the spindle axis, the rotational motion until the target position while decelerating the spindle axis so as to make the spindle axis reach the target position. Accordingly, it is no longer necessary to perform a parameter setting or adjustment, etc., required for the numerical control section to prepare acceleration and deceleration commands in conformity with the power characteristics of the spindle axis, and it is possible, with a simple configuration, to reduce the cycle time of a tapping process by executing an acceleration and deceleration control so as to maximize the acceleration capacity of the spindle axis. Further, the controller is configured so that, during a period when the spindle axis is decelerated by the position control to reach the target position after acceleration, the spindle axis performs the decelerated rotation at the positioning deceleration higher than a deceleration corresponding to the maximum acceleration while taking into account the mechanical loss of the drive source, and therefore, it is possible to improve the aforementioned effect of reducing the cycle time of the tapping process.

In the control method according to the other aspect, effects corresponding to those achieved by the above-described controller can be obtained.

BRIEF DESCRIPTION OF THE DRAWINGS

The objects, features and advantages of the present disclosure will become more apparent from the following description of the embodiments in connection with the accompanying drawings, wherein.

DETAILED DESCRIPTION

Figure 1:
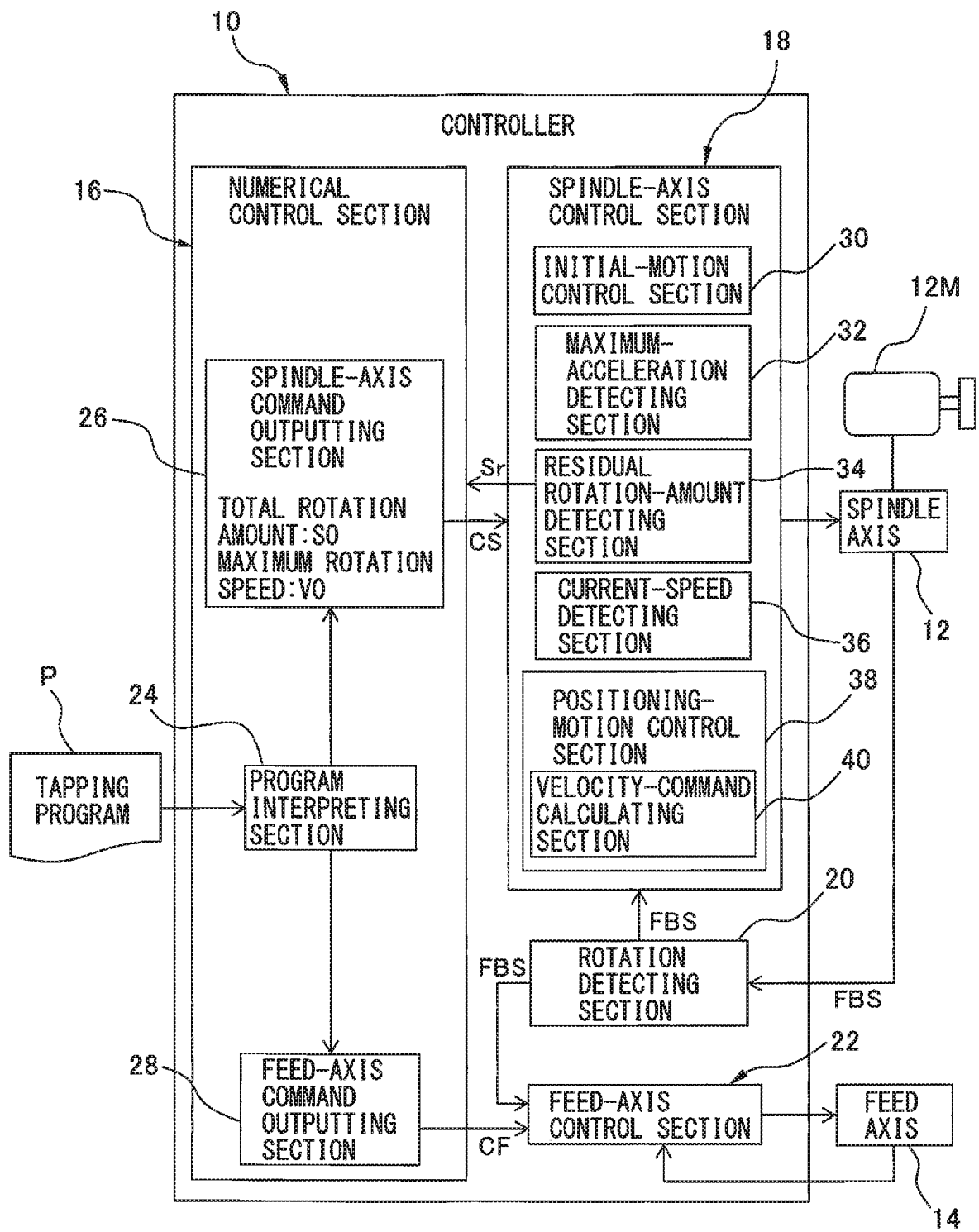
FIG. 1 is a functional block diagram depicting a configuration of a first embodiment of a machine tool controller.

Embodiments of the present disclosure will be described below with reference to the accompanying drawings. Throughout the drawings, corresponding components are denoted by common reference numerals.

FIG. 1 is a functional block diagram depicting a configuration of a device 10 of controlling (i.e., a controller 10 of) a machine tool, according to a first embodiment. The controller 10 has a configuration for controlling a synchronized operation (so called a master-slave synchronization) of a spindle axis 12 and a feed axis 14, in a machine tool (e.g., a lathe, a drilling machine, a machining center, etc.) capable of performing a tapping process by the synchronized operation, in which the feed axis 14 operates to follow the rotational motion of the spindle axis 12 by taking into account a thread pitch designated by a tapping program P. The spindle axis 12 is a control axis provided for a spindle motor 12M that rotates a hold unit for holding a workpiece or a tool at a necessary speed for processing. The feed axis 14 is a control axis provided for a servo motor (not depicted) that feeds a support unit for supporting a workpiece or a tool at a necessary speed for processing. For example, in a lathe, the tool may be linearly fed by the feed axis 14 relative to the workpiece rotated by the spindle axis 12, or alternatively, the workpiece rotated by the spindle axis 12 may be linearly fed by the feed axis 14 relative to the tool. On the other hand, in a drilling machine, the tool rotated by the spindle axis 12 may be linearly fed by the feed axis 14 relative to the workpiece, or alternatively, the workpiece may be linearly fed by the feed axis 14 relative to the tool rotated by the spindle axis 12. In any of the cases, the feed axis 14 that has a relatively wide margin of acceleration/deceleration torque during operation operates to follow the spindle axis 12 that has a relatively less margin of acceleration/deceleration torque during operation, whereby it is possible to reduce a synchronization error and improve a processing accuracy. It should be noted that, in the present disclosure, the configuration of the machine tool is not particularly limited.

The controller 10 includes a processor or processors, functioning as each of a numerical control section 16 configured to prepare a spindle-axis command CS and a feed-axis command CF, based on a tapping program P; a spindle-axis control section 18 configured to control a rotational motion of the spindle axis 12 in accordance with the spindle-axis command CS; a rotation detecting section 20 configured to detect a rotational position of the spindle axis 12; and a feed-axis control section 22 configured to control a feed motion of the feed axis 14 in accordance with the feed-axis command CF, based on the rotational position detected by the rotation detecting section 20. The numerical control section 16 includes a program interpreting section 24 configured to interpret the tapping program P; a spindle-axis command outputting section 26 configured to prepare the spindle-axis command CS in accordance with the interpretation of the program interpreting section 24 and send the spindle-axis command CS to the spindle-axis control section 18; and a feed-axis command outputting section 28 configured to prepare the feed-axis command CF in accordance with the interpretation of the program interpreting section 24 and send the feed-axis command CF to the feed-axis control section 22. The numerical control section 16 may include a hardware configuration of a conventional CNC unit.

Before starting a tapping process, the spindle-axis command outputting section 26 obtains, from a command value provided in the tapping program P interpreted by the program interpreting section 24, a total rotation amount S0 and a maximum rotation speed V0, of the spindle axis 12, during a period when the spindle axis operates from a starting position (a rotational position) to a target position (a rotational position), and sends the total rotation amount S0 and the maximum rotation speed V0 as the spindle-axis command CS to the spindle-axis control section 18. For example, in the case where the tapping program P includes instructions for processing an internal thread having a thread pitch of 1.25 mm and a thread depth of 30 mm with the maximum rotation speed (maximum revolutions per minute, in this example) V0 of the spindle axis 12 set at 3000 rev/min, the total rotation amount S0 of the spindle axis 12, from a process start position as the starting position to a target thread depth as the target position, is calculated as 30÷1.25=24 (rev). Accordingly, the spindle-axis command outputting section 26 notifies the spindle-axis control section 18 of V0=3000 (rev/min) and S0=24 (rev). In this way, the spindle-axis command CS does not include a position command (or movement command) and/or an acceleration/deceleration command, which makes the spindle axis 12 perform a rotational motion until the target position (or target thread depth).

The spindle-axis control section 18 controls the rotational motion of the spindle axis 12 by a conventional feedback control, with use of a rotational position FBS (i.e., a feedback value) of the spindle axis 12 detected by the rotation detecting section 20. The feed-axis control section 22 controls the feed motion of the feed axis 14, which follows the motion of the spindle axis 12, by a feedback control, with use of the rotational position FBS of the spindle axis 12 in addition to the feedback value of the feed position of the feed axis 14. The rotation detecting section 20 can obtain the rotational position FBS from the output of a position detector (not depicted), such as an encoder, etc., for detecting the operating position of the spindle axis 12 or the spindle motor 12M.

The spindle-axis control section 18 includes an initial-motion control section 30 configured to make the spindle axis 12 perform an accelerated rotation at maximum capacity using a maximum permissible current of a drive source (spindle motor 12M), from the starting position by a velocity control in which the maximum rotation speed V0, sent from the spindle-axis command outputting section 26, is set as a target value; a maximum-acceleration detecting section 32 configured to detect a maximum acceleration A0 (unit may be represented as, e.g., $rev/min^2$) of the spindle axis 12 during the accelerated rotation at maximum capacity, based on the rotational position FBS; a residual rotation-amount detecting section 34 configured to detect a residual rotation amount Sr of the spindle axis 12 during a period when the spindle axis operates from a current position (a rotational position) to the target position, based on the total rotation amount S0, sent from the spindle-axis command outputting section 26, and the rotational position FBS; a current-speed detecting section 36 configured to detect a current speed Vc of the spindle axis 12 based on the rotational position FBS; and a positioning-motion control section 38 configured to execute a position control for making the spindle axis 12 perform a decelerated rotation so as to reach the target position, based on the maximum acceleration A0, the residual rotation amount Sr and the current speed Vc, after the accelerated rotation at maximum capacity.

The spindle axis 12 is controlled by the spindle-axis control section 18 so as to make a transition from the accelerated rotation to the decelerated rotation at an instant when the spindle axis reaches the maximum rotation speed V0 or reaches a position where the residual rotation amount Sr is equal to one-half of the total rotation amount S0. During the decelerated rotation of the spindle axis 12, in which the positioning-motion control section 38 executes the position control to make the spindle axis 12 reach the target position, it is conceivable to make the spindle axis 12 perform the decelerated rotation at a deceleration corresponding to the maximum acceleration A0 detected by the maximum-acceleration detecting section 32, from the viewpoint of decreasing of cycle time. However, when taking into account a mechanical loss (friction loss, windage loss, etc.) of the drive source (spindle motor 12M), in the configuration in which the spindle axis 12 performs the decelerated rotation at the deceleration corresponding to the maximum acceleration A0, there may be cases where the decelerated rotation at maximum capacity using the maximum permissible current of the drive source (spindle motor 12M) cannot be implemented, in contrast with a condition during acceleration. Thus, in this embodiment, the positioning-motion control section 38 is configured, when executing the position control for the spindle axis 12, to make the spindle axis 12 perform the decelerated rotation at a positioning deceleration Apos (negative value) higher than (i.e., the absolute value of Apos is larger than the absolute value of) a deceleration (negative value) corresponding to the maximum acceleration A0. The positioning deceleration Apos is defined to be equal to or lower than a maximum deceleration Amax (negative value) (set as an upper limit) that is capable of compensating for a mechanical loss in the drive source (spindle motor 12M) during the decelerated rotation of the spindle axis 12. The maximum deceleration Amax can be determined by the following equation 1:

$$|A\max| = A0 \times (P\max + Pml)/P\max \qquad \text{equation 1}$$

or $$|A\max| = A0 + Apml \qquad \text{equation 1}$$

In this connection, "Pmax" represents a maximum power (or maximum capacity using the maximum permissible current) of the drive source (spindle motor 12M), "Pml" represents a mechanical loss in the drive source (spindle motor 12M), and "Apml" represents an acceleration corresponding to "Pml". "Pmax" may be obtained by, e.g., a designer of a system for a tapping process (hereinafter referred to as a system designer) from the characteristic value of the drive source (spindle motor 12M), and may be stored as one of control parameters in a memory (not depicted) of the controller 10. "Pml" may be previously measured by, e.g., a system designer through a known measuring process in connection with the drive source (spindle motor 12M), and may be stored as one of control parameters in a memory (not depicted) of the controller 10. "Apml" may be previously determined by, e.g., a system designer from the measured "Pml" through a known conversion expression, and may be stored as one of control parameters in a memory (not depicted) of the controller 10.

The positioning-motion control section 38 makes the spindle axis 12 perform the decelerated rotation at an arbitrary positioning deceleration Apos (A0<|Apos|≤|Amax|). In this connection, "Apos" can be determined by, e.g., multiplying "Amax" by a predetermined coefficient. The coefficient may be previously set by, e.g., a system designer, and may be stored as one of control parameters in a memory (not depicted) of the controller 10. According to this configuration, the controller 10 can make the spindle axis 12 perform the decelerated rotation with high-efficient use of a permissible current of the drive source (spindle motor 12M) while taking into account the mechanical loss of the drive source, and thereby can improve the effect of reducing the cycle time of a tapping process. In particular, in the configuration wherein the positioning-motion control section 38 makes the spindle axis 12 perform the decelerated rotation at the maximum deceleration Amax, the controller 10 can fully compensate for a possible reduction in deceleration, which corresponds to the mechanical loss of the drive source (spindle motor 12M), and make the spindle axis 12 perform the decelerated rotation at maximum capacity using the maximum permissible current of the drive source (spindle motor 12M) analogously to the condition during acceleration, and thereby reduce the cycle time of a tapping process more effectively. Note that the effect of reducing the cycle time will be described later in more detail.

The positioning-motion control section 38 can calculate the maximum deceleration Amax and the positioning deceleration Apos before starting the position control. In a configuration wherein the spindle-axis control section 18 executes the position control for the spindle axis 12 by a velocity command, the positioning-motion control section 38 may include a velocity-command calculating section 40 configured to calculate a velocity command for making the spindle axis 12 perform the decelerated rotation at the positioning deceleration Apos.

The positioning-motion control section 38 monitors the residual rotation amount Sr and the current speed Vc, which are sequentially detected by the residual rotation-amount detecting section 34 and the current-speed detecting section 36, respectively, and calculates a position at which it is expected that "Sr" becomes equal to zero (i.e., the spindle axis reaches the target position) if the spindle axis 12 is decelerated from the current speed Vc at the positioning deceleration Apos, and starts the position control at an instant when the spindle axis 12 reaches the position. Further details of a machine tool control method (including a velocity control and a position control) carried out by the controller 10 will be described later.

Figure 2:
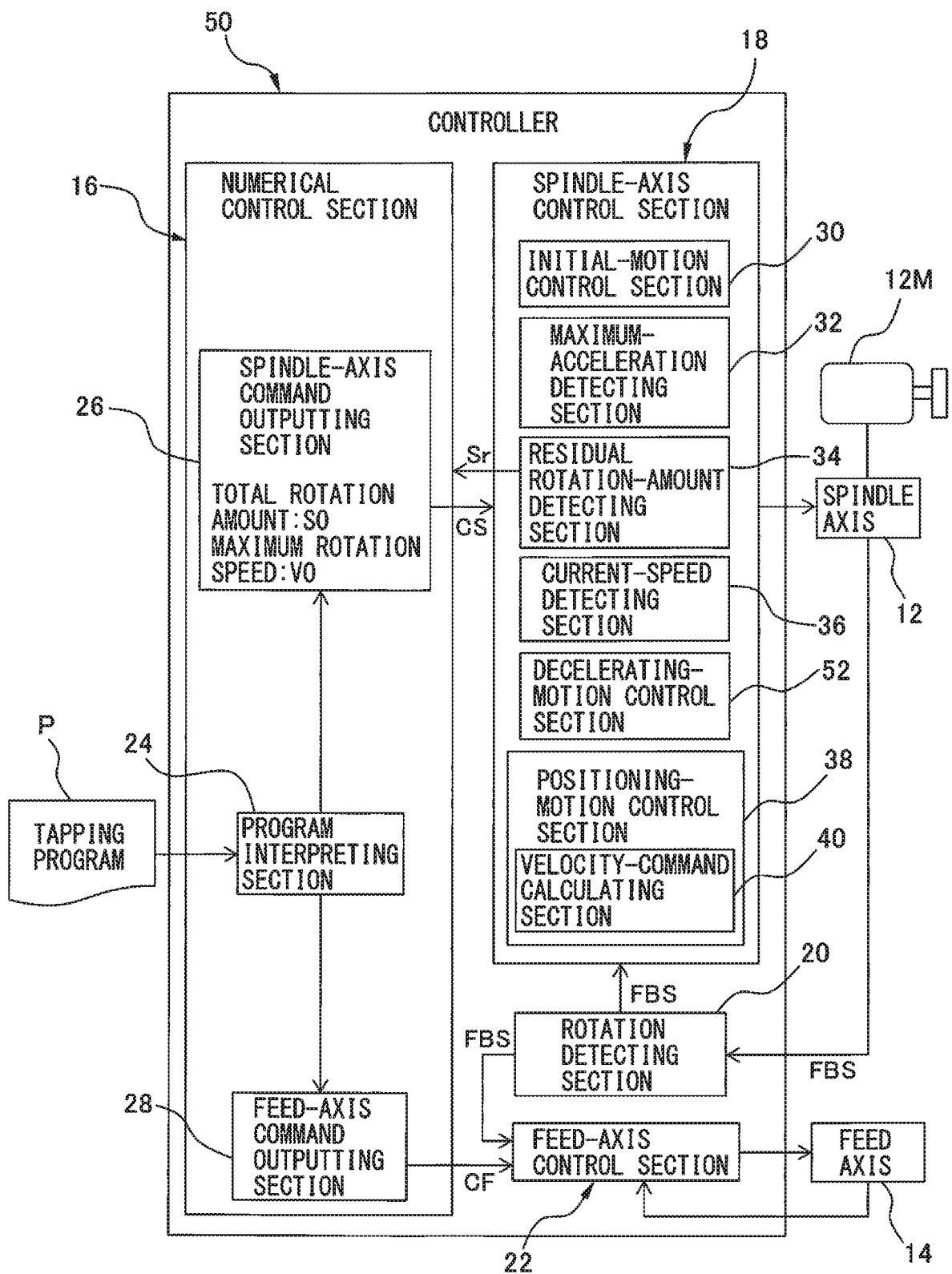
FIG. 2 is a functional block diagram depicting a configuration of a second embodiment of a machine tool controller.

FIG. 2 is a functional block diagram depicting a configuration of a controller 50 of a machine tool, according to a second embodiment. The controller 50 includes, in addition to the aforementioned configuration of the controller 10, a decelerating-motion control section 52 configured to execute a velocity control for making the spindle axis 12 perform a decelerated rotation from a maximum speed in the accelerated rotation, before the positioning-motion control section 38 starts the position control. The configuration of the controller 50, other than the decelerating-motion control section 52, is analogous to that of the controller 10, and therefore corresponding components are denoted with common reference numerals and detailed descriptions thereof are not repeated.

The controller 50 includes a processor or processors, functioning as each of a numerical control section 16 configured to prepare a spindle-axis command CS and a feed-axis command CF, based on a tapping program P; a spindle-axis control section 18 configured to control a rotational motion of the spindle axis 12 in accordance with the spindle-axis command CS; a rotation detecting section 20 configured to detect a rotational position of the spindle axis 12; and a feed-axis control section 22 configured to control a feed motion of the feed axis 14 in accordance with the feed-axis command CF, based on the rotational position detected by the rotation detecting section 20. The spindle-axis control section 18 includes an initial-motion control section 30 configured to make the spindle axis 12 perform an accelerated rotation at maximum capacity using a maximum permissible current of a drive source (spindle motor 12M), from a starting position by a velocity control in which the maximum rotation speed V0, sent from the spindle-axis command outputting section 26, is set as a target value; a maximum-acceleration detecting section 32 configured to detect a maximum acceleration A0 of the spindle axis 12 during the accelerated rotation at maximum capacity, based on the rotational position FBS; a residual rotation-amount detecting section 34 configured to detect a residual rotation amount Sr of the spindle axis 12 during a period when the spindle axis operates from a current position to a target position, based on the total rotation amount S0, sent from the spindle-axis command outputting section 26, and the rotational position FBS; a current-speed detecting section 36 configured to detect a current speed Vc of the spindle axis 12 based on the rotational position FBS; a positioning-motion control section 38 configured to execute a position control for making the spindle axis 12 perform a decelerated rotation at a positioning deceleration Apos so as to reach the target position, based on the maximum acceleration A0, the residual rotation amount Sr and the current speed Vc, after the accelerated rotation at maximum capacity; and a decelerating-motion control section 52 configured to execute a velocity control for making the spindle axis 12 perform a decelerated rotation so as to reach a predetermined intermediate speed Vb, after the accelerated rotation at maximum capacity and before starting the position control.

The intermediate speed Vb is previously determined for the spindle axis 12 as a rotational speed (e.g., a base speed of the spindle motor 12M) by which an acceleration with a constant torque (i.e., a constant acceleration) can be performed from the start of operation to the intermediate speed Vb, and may be stored as one of control parameters in a memory (not depicted) of the controller 50. In practice, the intermediate speed Vb may take any value lower than or equal to the base speed of the spindle motor (or a speed determined by taking into account a reduction ratio, if any, between the spindle motor 12M and the spindle axis 12).

Under the control executed by the spindle-axis control section 18, the spindle axis 12 makes a transition from the accelerated rotation to the decelerated rotation, at an instant when the spindle axis reaches the maximum rotation speed V0 or reaches a position where the residual rotation amount Sr is equal to one-half of the total rotation amount S0. When the spindle axis 12 decelerates from a maximum speed of the accelerated rotation, the decelerating-motion control section 38 executes the velocity control for the spindle axis 12, based on the residual rotation amount Sr and the current speed Vc, which are sequentially detected by the residual rotation-amount detecting section 34 and the current-speed detecting section 36, respectively, in a speed range up to the intermediate speed Vb. On the other hand, in a speed range from the intermediate speed Vb to the target position, the positioning-motion control section 38 makes the spindle axis 12 perform the decelerated rotation at the positioning deceleration Apos higher than a deceleration corresponding to the maximum acceleration A0 detected by the maximum-acceleration detecting section 32 (A0<|Apos|≤|Amax|), in order to reduce a cycle time. The positioning-motion control section 38 monitors the residual rotation amount Sr and the current speed Vc, which are sequentially detected by the residual rotation-amount detecting section 34 and the current-speed detecting section 36, respectively, and calculates a position at which it is expected that "Sr" becomes equal to zero (i.e., the spindle axis reaches the target position) if the spindle axis 12 is decelerated from the current speed Vc (=Vb) at the positioning deceleration Apos, and starts the position control at an instant when the spindle axis 12 reaches the calculated position. Further details of a machine tool control method (including a velocity control and a position control) carried out by the controller 50 will be described later.

The controller 10, 50 is capable of controlling, in a tapping process using a machine tool, a rotational motion of the spindle axis 12 for cutting a pilot hole of a workpiece with a tool until a target thread depth (referred to as a cutting motion, in this application). Also, the controller 10, 50 is capable of controlling, in a tapping process using a machine tool, a rotational motion of the spindle axis 12 for pulling out a tool from a workpiece after cutting a pilot hole of the workpiece until a target thread depth (referred to as a return motion, in this application). In the control of the cutting motion, the "starting position" corresponds to a "process start position" of the tapping process, and the "target position" corresponds to a "target thread depth" of the tapping process. In the control of the return motion, the "starting position" corresponds to a "target thread depth" of the tapping process, and the "target position" corresponds to a "return completion position" of the tapping process.

Figure 3:
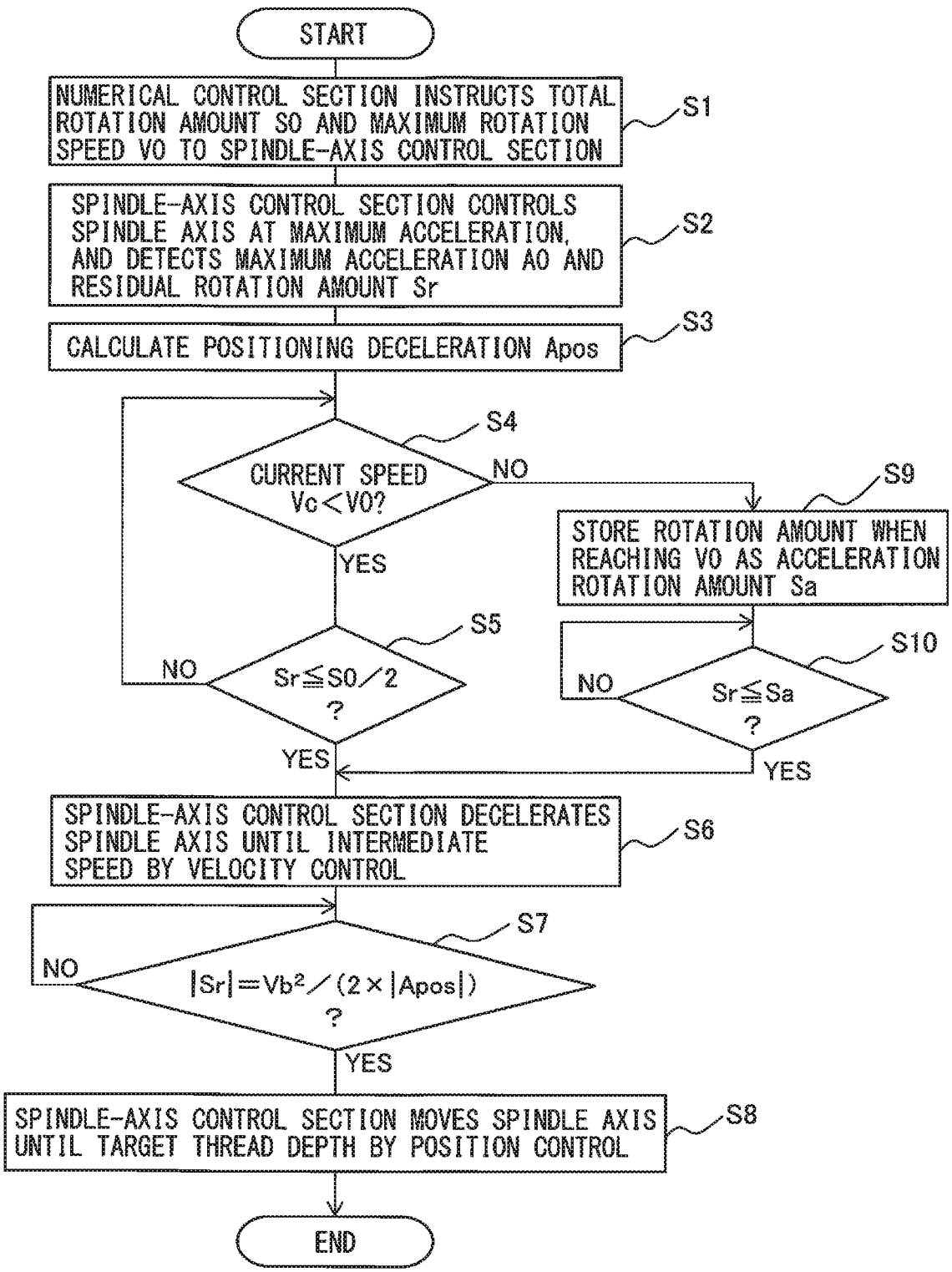
FIG. 3 is a flowchart depicting a cutting motion control method for a tapping process, in a first embodiment of a machine tool control method.
Figure 4:
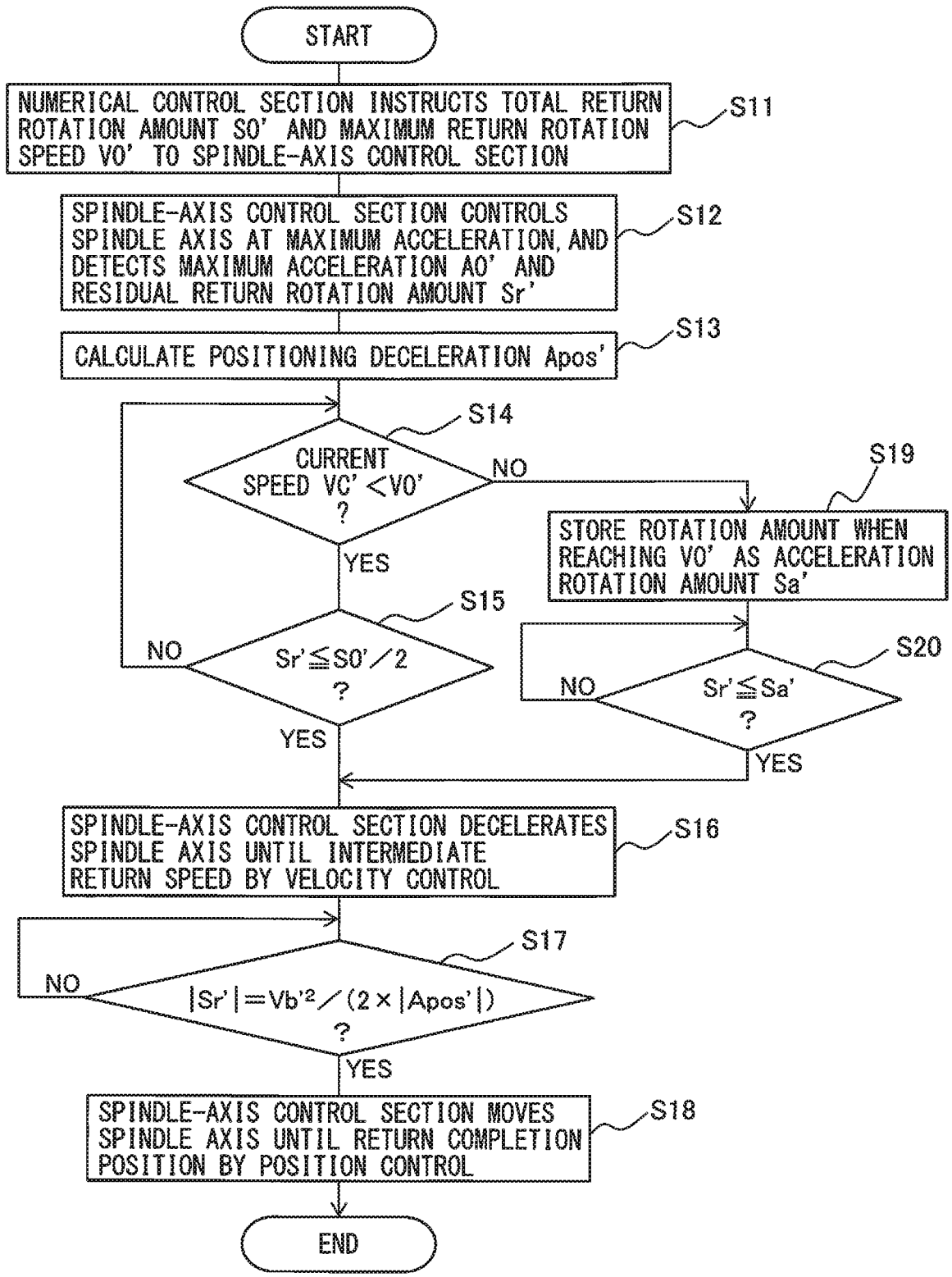
FIG. 4 is a flowchart depicting a return motion control method for a tapping process, in the first embodiment of a machine tool control method.
Figure 5:
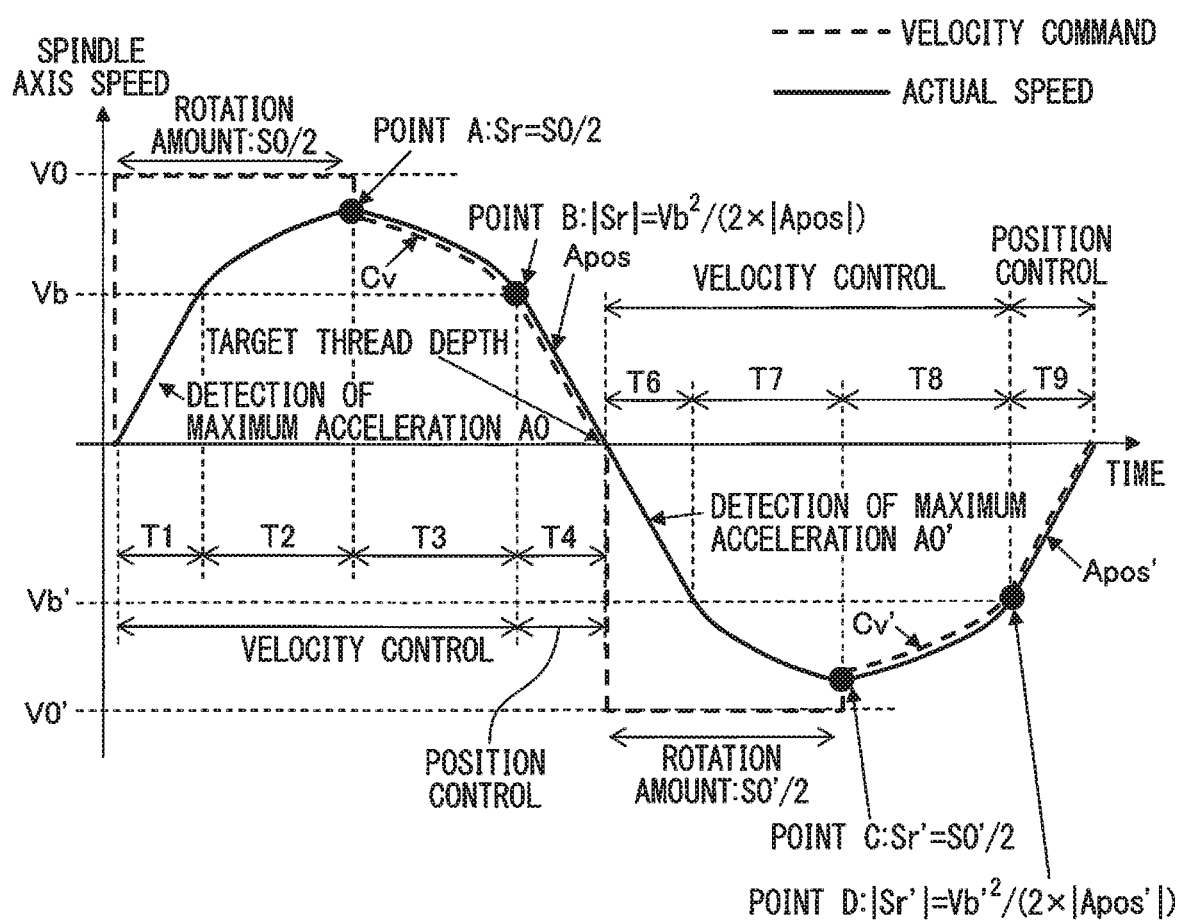
FIG. 5 is a diagram depicting one example of the motion of a spindle axis, achieved in the embodiment of FIGS. 2-4.
Figure 6:
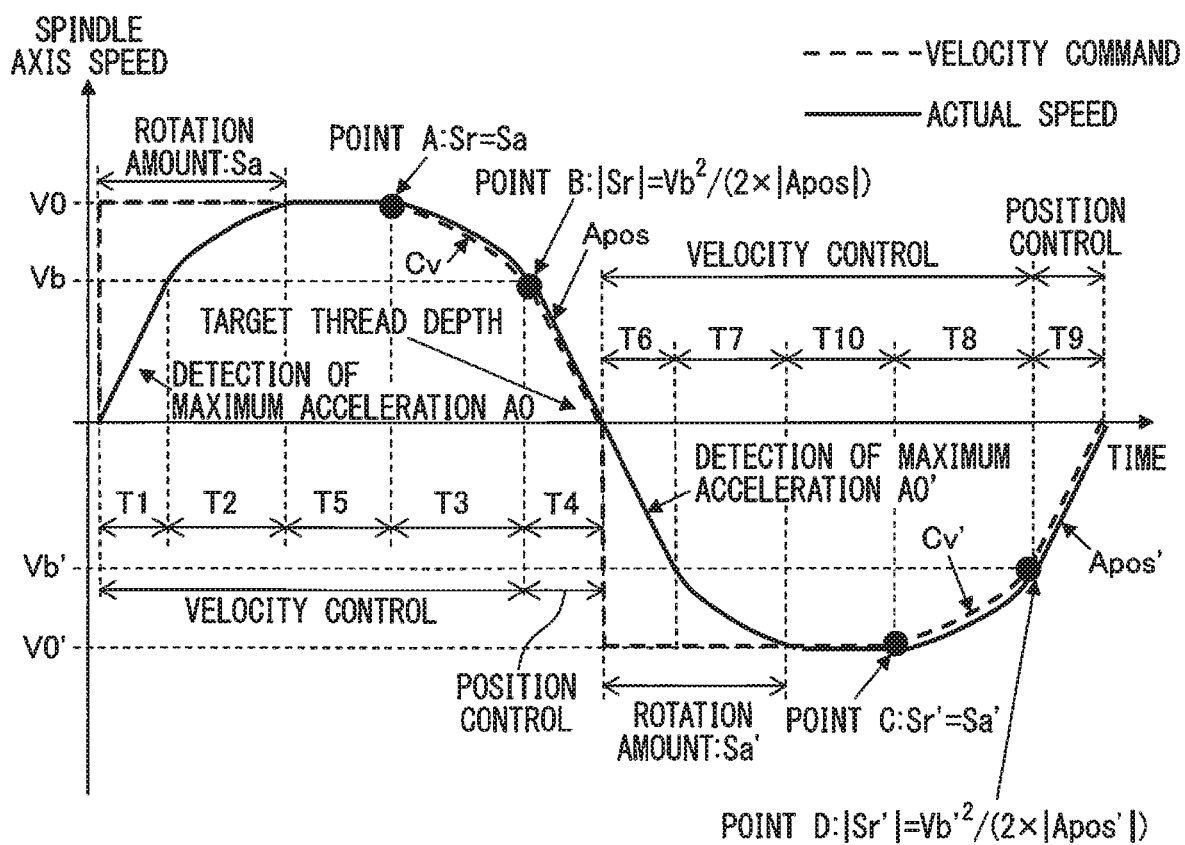
FIG. 6 is a diagram depicting another example of the motion of a spindle axis, achieved in the embodiment of FIGS. 2-4.

FIGS. 3 and 4 depict the first embodiment of a method of controlling a machine tool, executed by the controller 50. FIGS. 5 and 6 depict two different examples of motions of the spindle axis 12, achieved by the control method of FIGS. 3 and 4. The control method according to the illustrated embodiment may control both of the cutting motion (FIG. 3) and the return motion (FIG. 4) of the spindle axis 12 in the tapping process. For better understanding, the following description uses the terms "total rotation amount", "maximum rotation speed", "accelerated rotation", "maximum acceleration", "residual rotation amount", "current speed", "decelerated rotation", "intermediate speed", "deceleration", "positioning rotation amount" and "positioning deceleration" in relation to the control of the cutting motion, while uses respectively corresponding, substantially synonymous terms "total return-rotation amount", "maximum return-rotation speed", "accelerated inverse rotation", "maximum acceleration of inverse rotation", "residual return-rotation amount", "current speed of inverse rotation", "decelerated inverse rotation", "intermediate return-speed", "deceleration of inverse rotation", "positioning return-rotation amount" and "positioning deceleration of inverse rotation" in relation to the control of the return motion.

First, a method of controlling the cutting motion of the spindle axis 12, executed by the controller 50, will be described below with reference to a flow chart illustrated in FIG. 3 together with FIG. 2. At step S1, the numerical control section 16 (the spindle-axis command outputting section 26) obtains, from a command value provided in the tapping program P interpreted by the program interpreting section 24, the total rotation amount S0 and the maximum rotation speed V0, of the spindle axis 12, during a period when the spindle axis operates from the process start position (or starting position) to the target thread depth (or target position), and instructs the total rotation amount S0 and the maximum rotation speed V0 to the spindle-axis control section 18. At step S2, the spindle-axis control section 18 (the initial-motion control section 30, the maximum-acceleration detecting section 32 and the residual rotation-amount detecting section 34) makes the spindle axis 12 perform the accelerated rotation at maximum capacity using the maximum permissible current of the drive source (spindle motor 12M) to perform the cutting motion from the process start position (i.e., zero speed), by a velocity control in which the maximum rotation speed V0 is set as a target speed, detects the maximum acceleration A0 during the accelerated rotation at maximum capacity, and sequentially detects the residual rotation amount Sr from the current position during the accelerated rotation. The spindle-axis control section 18 notifies the detected residual rotation amount Sr to the numerical control section 16 every time it is detected.

Next, at step S3, the spindle-axis control section 18 (the positioning-motion control section 38) calculates the positioning deceleration Apos higher than a deceleration corresponding to the maximum acceleration A0 and equal to or lower than the maximum deceleration Amax (set as an upper limit) capable of compensating for a mechanical loss in the drive source (spindle motor 12M) during the decelerated rotation of the spindle axis 12. The calculation of Apos can be performed during, or after, the execution of subsequent steps (S4-S7, S9, S10) described below, provided that it is performed after the maximum acceleration A0 is detected and before the positioning-motion control section 38 starts the position control.

Next, at step S4, the spindle-axis control section 18 (the current-speed detecting section 36) sequentially detects the current speed Vc during the accelerated rotation at maximum capacity, and judges whether the current speed Vc has not reached the maximum rotation speed V0 every time it is detected. If "Vc" has not yet reached "V0", the spindle-axis control section 18 (the residual rotation-amount detecting section 34) judges, at step S5, whether the residual rotation amount Sr is equal to or less than one-half of the total rotation amount S0. If "Sr" is equal to or less than one-half of "S0", the spindle-axis control section 18 (the decelerating-motion control section 52) makes, at step S6, the spindle axis 12 perform the decelerated rotation until the intermediate speed Vb, so as to continuously perform the cutting motion. If "Sr" is not equal to or not less than one-half of "S0", the control flow returns to step S4.

Referring now to FIG. 5, one example of the cutting motion of the spindle axis 12, in the case where the residual rotation amount Sr reaches one-half of the total rotation amount S0 before the current speed Vc reaches the maximum rotation speed V0 (i.e., in the case where the judgment results at respective steps S4 and S5 are YES), is depicted by a speed-time curve (the curve above a time axis). The accelerated rotation at maximum capacity of the spindle axis 12 at step S2 is performed during time periods T1 and T2 depicted in FIG. 5, and the maximum acceleration A0 is detected during the constant acceleration in the time period T1 (i.e., a time period from a point when the spindle axis starts at the process start position to a point when the spindle axis reaches the intermediate speed Vb). When the rotational speed of the spindle axis 12 exceeds the intermediate speed Vb (the base speed of the spindle motor 12M, in this example), the acceleration of the spindle axis 12 gradually decreases from the maximum acceleration A0 due to the characteristics of the spindle motor 12M. At a time point A when the residual rotation amount Sr reaches one-half of the total rotation amount S0 (i.e., when the rotation amount from the start of processing reaches one-half of the total rotation amount S0) (or when the judgment result at step S5 becomes YES), the motion of the spindle axis 12 changes from the accelerated rotation to the decelerated rotation, and in time period T3, the spindle axis 12 performs the decelerated rotation at step S6. In the time periods T1, T2 and T3, the spindle-axis control section 18 executes a velocity control for the spindle axis 12 (an exemplary velocity command in these time periods is illustrated by a broken line).

During the time period T3 (step S6), the spindle-axis control section 18 (the residual rotation-amount detecting section 34 and the current-speed detecting section 36) also sequentially detects the residual rotation amount Sr from the current position and the current speed Vc, of the spindle axis 12. In the time period T3 (step S6), the spindle-axis control section 18 (the decelerating-motion control section 52) executes the velocity control to make the spindle axis 12 perform the decelerated rotation from the point A (or a maximum speed) until the intermediate speed Vb, and in the meantime, successively updates a velocity command Cv for the decelerated rotation with use of the residual rotation amount Sr and the current speed Vc (velocity command Cv is illustrated by a broken line in FIG. 5). More specifically, the decelerating-motion control section 52 successively updates the velocity command Cv and makes the spindle axis 12 perform the decelerated rotation by the successively updated velocity command Cv, so that the residual rotation amount Sr of the spindle axis 12 at an instant when the spindle axis 12 reaches the predetermined intermediate speed Vb becomes equal to a positioning rotation amount Spos of the spindle axis 12 required for the spindle axis to reach the target thread depth under the position control executed by the positioning-motion control section 38.

The positioning rotation amount Spos corresponds to a position of a time point B (FIG. 5), at which it is expected that the residual rotation amount Sr becomes equal to zero and the current speed Vc becomes equal to zero (i.e., the spindle axis reaches the target thread depth) when the positioning-motion control section 38 decelerates the spindle axis 12 from the current speed Vc (hereinafter described as a rotation number per second (unit thereof being represented as rev/sec)) at the aforementioned positioning deceleration Apos (negative value). The positioning rotation amount Spos is determined, as the absolute value of the residual rotation amount Sr (negative value) as seen from the point of Sr=0, by the following equation:

$$|Sr|=Vc^2/(2\times|Apos|)=Spos$$

As already described, it is assumed that the current speed Vc of the spindle axis 12 has reached the intermediate speed Vb at the point B. Thus, the position |Sr| of the point B and the positioning rotation amount Spos can be determined by the following equation 2:

$$|Sr|=Vb^2/(2\times|Apos|)=Spos \qquad \text{equation 2}$$

If the residual rotation amount Sr at an instant when the spindle axis 12 reaches the intermediate speed Vb is equal to the positioning rotation amount Spos of the spindle axis 12, the correspondence between the residual rotation amount (i.e., the current position) Sr, the current speed Vc (rev/sec) and the current deceleration Ac (rev/sect), of the spindle axis 12 during the time period T3, is represented by the following equation:

$$|Ac|=(Vc^2-Vb^2)/(2\times(Sr-Spos))$$

based on a formula:

$$Vc^2-Vb^2=2\times|Ac|\times(Sr-Spos)$$

In the time period T3 (step S6), the spindle-axis control section 18 (the decelerating-motion control section 52) constantly monitors the residual rotation amount Sr and the current speed Vc of the spindle axis 12, and determines a new or updated velocity command Cv by subtracting a value obtained by multiplying the aforementioned current deceleration Ac by a velocity-command updating cycle Tctl (sec) (i.e., a cycle of preparing the velocity command and notifying it to the spindle axis 12 by the decelerating-motion control section 52) from the current speed Vc (i.e., the last velocity command Cv). The velocity command Cv is represented by the following equation 3:

$$Cv=Vc-Ac\times Tctl \qquad \text{equation 3}$$

According to the equation 3, the decelerating-motion control section 52 successively updates the velocity command Cv in the velocity-command updating cycle Tctl. The spindle axis 12 performs the decelerated rotation while gradually increasing the deceleration Ac in accordance with the successively updated velocity command Cv, during the operation from the point A to the point B, and reaches the point B at an instant when being decelerated to the intermediate speed Vb (FIG. 5).

Turning back to FIG. 3, at step S7, the spindle-axis control section 18 (the positioning-motion control section 38) judges whether the absolute value |Sr| of the residual rotation amount Sr of the spindle axis 12 satisfies the equation 2: |Sr|=Vb²/(2×|Apos|) (i.e., whether or not the rotational position of the spindle axis 12 has reached the point B). If the equation 2 is satisfied, the spindle-axis control section 18 (the positioning-motion control section 38) prepares, at step S8, a movement command for making the spindle axis 12 perform the decelerated rotation at the positioning deceleration Apos and reach the point of Sr=0 (i.e., the target thread depth), and executes a position control for the spindle axis 12 with use of the prepared movement command. If the equation 2 is not satisfied, the judgment at step S7 is repeated until the equation 2 is satisfied. The spindle axis 12 performs, in accordance with the movement command from the spindle-axis control section 18 (the positioning-motion control section 38), the cutting motion from the point B toward the target thread depth, by performing the decelerated rotation at the positioning deceleration Apos, and reaches and stops at the target thread depth when Sr becomes equal to zero. In this way, in time period T4 (FIG. 5) in which the spindle axis operates from the point B to reach the target thread depth, the spindle-axis control section 18 executes a position control for the spindle axis 12 (an exemplary velocity command at a constant acceleration, obtained from the movement command, is depicted by a broken line).

At aforementioned step S4, if the spindle-axis control section 18 (the current-speed detecting section 36) judges that the current speed Vc has reached the maximum rotation speed V0, the control flow goes to step S9 instead of step S5. The spindle-axis control section 18 (the residual rotation-amount detecting section 34) stores, at step S9, a rotation amount (i.e., a rotational position FBS) of the spindle axis 12 from the process start position at an instant when the spindle axis reaches the maximum rotation speed V0, as an acceleration rotation amount Sa. Then, at step S10, the spindle-axis control section 18 (the residual rotation-amount detecting section 34) judges whether the residual rotation amount Sr is equal to or less than the acceleration rotation amount Sa. If "Sr" is equal to or less than "Sa", the control flow goes to step S6, and subsequently executes steps S7 and S8, so as to perform the cutting motion until the target thread depth. If "Sr" is not equal to or not less than "Sa", the judgment at step S10 is repeated until "Sr" becomes equal to or less than "Sa".

Referring now to FIG. 6, one example of the cutting motion of the spindle axis 12, in the case where the current speed Vc reaches the maximum rotation speed V0 before the residual rotation amount Sr reaches one-half of the total rotation amount S0 (i.e., in the case where the judgment result at step S4 is No), is depicted by a speed-time curve (the curve above a time axis). As depicted in FIG. 6, the accelerated rotation of the spindle axis 12 at maximum capacity at step S2 is performed during time periods T1 and T2, and the maximum acceleration A0 is detected during the constant acceleration in the time period T1 (i.e., a time period from a point when the spindle axis starts at the process start position to a point when the spindle axis reaches the intermediate speed Vb). When the rotational speed of the spindle axis 12 exceeds the intermediate speed Vb (the base speed of the spindle motor 12M, in this example), the acceleration of the spindle axis 12 gradually decreases from the maximum acceleration A0 due to the characteristics of the spindle motor 12M. The current speed Vc of the spindle axis 12 reaches the maximum rotation speed V0 before the residual rotation amount Sr reaches one-half of the total rotation amount S0. Thereafter, the spindle axis 12 rotates at the constant speed V0 (i.e., null acceleration) over time period T5 so as to continue the cutting motion. At a time point A when the residual rotation amount Sr becomes equal to the acceleration rotation amount Sa (i.e., when the judgment result at step S10 becomes YES), the motion of the spindle axis 12 changes from the accelerated rotation to the decelerated rotation. Then, in time period T3 (step S6), the spindle axis 12 performs the aforementioned decelerated rotation while gradually increasing the deceleration Ac (by the velocity control), and in time period T4 (step S8), the spindle axis 12 performs the decelerated rotation at the positioning deceleration Apos. The spindle axis 12 reaches and stops at the target thread depth when "Sr" becomes equal to zero. In the time periods T1, T2, T3 and T4, the spindle axis 12 operates in the same manner as the motion depicted in FIG. 5.

In the motion examples depicted in FIGS. 5 and 6, during a period when the spindle-axis control section 18 controls the rotational (or cutting) motion of the spindle axis 12 from the process start position to the target thread depth, the feed-axis control section 22 (FIG. 2) executes a feedback control for the feed axis 14 so as to make the feed axis perform a feed motion while following the motion of the spindle axis 12, with use of the rotational position FBS of the spindle axis 12. During a period when the spindle-axis control section 18 executes the processes from step S1 to step S10, the numerical control section 16 monitors the residual rotation amount Sr notified from the spindle-axis control section 18, and judges that the tapping process has reached the target thread depth when the residual rotation amount Sr becomes equal to or less than a first predetermined value (a very small value close to zero).

As described above, the controller 50 has a configuration wherein, when the spindle axis 12 performs the cutting motion (rotational motion) from the process start position (starting position) to the target thread depth (target position), the numerical control section 16 instructs only the total rotation amount S0 and the maximum rotation speed V0, of the spindle axis 12, as the spindle axis command CS to the spindle-axis control section 18, and the spindle-axis control section 18 performs, in accordance with the spindle axis command CS, the cutting motion by accelerating the spindle axis 12 with the maximum power using the maximum permissible current, aiming at the maximum rotation speed V0, and continuously performs, based on the maximum acceleration A0 detected during the maximum accelerated rotation as well as the sequentially detected residual rotation amount Sr and current speed Vc of the spindle axis 12, the cutting motion until the target thread depth while decelerating the spindle axis 12, so as to make the spindle axis reach the target thread depth. Therefore, according to the controller 50, it is no longer necessary to perform a parameter setting or adjustment, etc., required for the numerical control section 16 to prepare acceleration and deceleration commands in conformity with the power characteristics of the spindle axis 12, and it is possible, with a simple configuration, to reduce the cycle time of the tapping process by executing an acceleration and deceleration control so as to maximize the acceleration capacity of the spindle axis 12.

Further, the controller 50 is configured so that, during a period when the spindle axis 12 is decelerated by the position control to reach the target thread depth after acceleration, the spindle axis 12 performs the decelerated rotation at the positioning deceleration Apos higher than a deceleration corresponding to the maximum acceleration A0 ($A0 < |Apos| \leq |Amax|$) while taking into account the mechanical loss of the drive source (spindle motor 12M). Therefore, according to the controller 50, it is possible to improve the aforementioned effect of reducing the cycle time of the tapping process.

The controller 50 is capable of executing, in relation to the aforementioned return motion of the spindle axis 12, a control strategy analogous to the aforementioned control strategy for the cutting motion from the process start position to the target thread depth. FIGS. 5 and 6 depict one example of the return motion of the spindle axis 12, corresponding to the aforementioned cutting motion of the spindle axis 12, by a speed-time curve (the curve below a time axis), in addition to the cutting motion. With reference to a flow chart illustrated in FIG. 4 together with FIGS. 2, 5 and 6, a method of controlling the return motion of the spindle axis 12, executed by the controller 50, will be described below. Note that, for a better understanding, a reference numeral or symbol used in the following explanation is provided with a prime (') that is added to a corresponding reference numeral or symbol used in the explanation of the cutting motion control method.

After it is judged that the tapping process has reached the target thread depth in the cutting motion control flow of FIG. 3, the numerical control section 16 (the spindle-axis command outputting section 26) obtains, at step S11, a total return-rotation amount S0' and a maximum return-rotation speed V0', of the spindle axis 12, during a period when the spindle axis operates from the target thread depth (or starting position) to the return completion position (or target position), from a command value provided in the tapping program P interpreted by the program interpreting section 24, and sends the total return-rotation amount S0' and the maximum return-rotation speed V0' as a spindle-axis command CS to the spindle-axis control section 18. The spindle-axis command CS for the return motion also does not include a position command (or movement command) and/or an acceleration/deceleration command, which makes the spindle axis 12 perform a rotational motion until the return completion position. Note that the return completion position may be the same as the process start position, or may be different from the process start position. In the case where the return completion position coincides with the process start position, the total return-rotation amount S0' is equal to the total rotation amount S0 in the cutting motion, but the maximum return-rotation speed V0' is not always equal to the maximum rotation speed V0 in the cutting motion. Also, if the total return-rotation amount S0' and the maximum return-rotation speed V0' are equal to the total rotation amount S0 and the maximum rotation speed V0 in the cutting motion, the return motion is depicted by the substantially same speed-time curve as that of the cutting motion, but if the total return-rotation amount S0' and the maximum return-rotation speed V0' are different from the total rotation amount S0 and the maximum rotation speed V0 in the cutting motion, the return motion is not always depicted by the same speed-time curve as that of the cutting motion.

Next, at step S12, the spindle-axis control section 18 (the initial-motion control section 30, the maximum-acceleration detecting section 32 and the residual rotation-amount detecting section 34) executes the following processes. The initial-motion control section 30 makes the spindle axis 12 perform an accelerated inverse rotation at maximum capacity using the maximum permissible current of the drive source (spindle motor 12M) from the target thread depth (i.e., zero speed), by a velocity control in which the maximum return-rotation speed V0' is set as a target value, so as to perform the return motion. The maximum-acceleration detecting section 32 detects a maximum acceleration A0' of inverse rotation of the spindle axis 12, during the accelerated inverse rotation at maximum capacity from the target thread depth, based on the rotational position FBS. The residual rotation-amount detecting section 34 sequentially detects a residual return-rotation amount Sr' of the spindle axis 12 from a current position during the accelerated inverse rotation, based on the total return-rotation amount S0' and the rotational position FBS. The spindle-axis control section 18 notifies the detected residual return-rotation amount Sr' to the numerical control section 16 every time it is detected.

Next, at step S13, the spindle-axis control section 18 (the positioning-motion control section 38) calculates the positioning deceleration Apos' of inverse rotation higher than a deceleration corresponding to the maximum acceleration A0' of inverse rotation and equal to or lower than the maximum deceleration Amax' (set as an upper limit) capable of compensating for a mechanical loss in the drive source (spindle motor 12M) during the decelerated inverse rotation of the spindle axis 12. The calculation of Apos' can be performed during, or after, the execution of subsequent steps (S14-S17, S19, S20) described below, provided that it is performed after the maximum acceleration A0' of inverse rotation is detected and before the positioning-motion control section 38 starts the position control. Apos' and Amax' are substantially synonymous with the aforementioned Apos and Amax, respectively, and thus can be calculated by the aforementioned equation 1, etc.

Next, at step S14, the spindle-axis control section 18 (the current-speed detecting section 36) sequentially detects a current speed Vc' of inverse rotation, based on the rotational position FBS during the accelerated inverse rotation at maximum capacity, and judges whether the current speed Vc' has not reached the maximum return-rotation speed V0' every time it is detected. If "Vc'" has not reached "V0'", the spindle-axis control section 18 (the residual rotation-amount detecting section 34) judges, at step S15, whether the residual return-rotation amount Sr' is equal to or less than one-half of the total return-rotation amount S0'. If "Sr'" is equal to or less than one-half of "S0'", the spindle-axis control section 18 (the decelerating-motion control section 52) makes, at step S16, the spindle axis 12 perform a decelerated inverse rotation until the intermediate return-speed Vb', so as to continuously perform the return motion. If "Sr'" is not equal to or not less than one-half of "S0'", the control flow returns to step S14.

Referring now to FIG. 5, one example of the return motion of the spindle axis 12, in the case where the residual return-rotation amount Sr' reaches one-half of the total return-rotation amount S0' before the current speed Vc' of inverse rotation reaches the maximum return-rotation speed V0' (i.e., in the case where the judgment results at respective steps S14 and S15 are YES), is depicted by a speed-time curve (the curve below a time axis). The accelerated inverse rotation at maximum capacity of the spindle axis 12 at step S12 is performed during time periods T6 and T7 depicted in FIG. 5, and the maximum acceleration A0' of inverse rotation is detected during the constant acceleration in the time period T6 (i.e., a time period from a point when the spindle axis starts at the target thread depth to a point when the spindle axis reaches the intermediate return-speed Vb'). When the rotational speed of the spindle axis 12 exceeds the intermediate return-speed Vb' (the base speed of the spindle motor 12M, in this example), the acceleration of the spindle axis 12 gradually decreases from the maximum acceleration A0' due to the characteristics of the spindle motor 12M. At a time point C when the residual return-rotation amount Sr' reaches one-half of the total return-rotation amount S0' (i.e., when the rotation amount from the start of returning reaches one-half of the total return-rotation amount S0') (or when the judgment result at step S15 becomes YES), the motion of the spindle axis 12 changes from the accelerated inverse rotation to the decelerated inverse rotation, and in time period T8, the spindle axis 12 performs the decelerated inverse rotation at step S16. In the time periods T6, T7 and T8, the spindle-axis control section 18 executes a velocity control for the spindle axis 12 (an exemplary velocity command in these time periods is illustrated by a broken line).

During the time period T8 (step S16), the spindle-axis control section 18 (the residual rotation-amount detecting section 34 and the current-speed detecting section 36) also sequentially detects the residual return-rotation amount Sr' from the current position and the current speed Vc' of inverse rotation, of the spindle axis 12. In the time period T8 (step S16), the spindle-axis control section 18 (the decelerating-motion control section 52) executes the velocity control to make the spindle axis 12 perform the decelerated inverse rotation from the point C (or a maximum speed of inverse rotation) until the intermediate return-speed Vb', and in the meantime, successively updates a velocity command Cv' for the decelerated inverse rotation with use of the residual return-rotation amount Sr' and the current speed Vc' of inverse rotation (velocity command Cv' is illustrated by a broken line in FIG. 5). More specifically, the decelerating-motion control section 52 successively updates the velocity command Cv' and makes the spindle axis 12 perform the decelerated inverse rotation by the successively updated velocity command Cv', so that the residual return-rotation amount Sr' of the spindle axis 12 at an instant when the spindle axis 12 reaches the predetermined intermediate return-speed Vb' becomes equal to a positioning return-rotation amount Spos' of the spindle axis 12 required for the spindle axis to stop at the return completion position under the position control executed by the positioning-motion control section 38.

The positioning return-rotation amount Spos' corresponds to a position of a time point D (FIG. 5), at which it is expected that the residual return-rotation amount Sr' becomes equal to zero and the current speed Vc' of inverse rotation becomes equal to zero (i.e., the spindle axis reaches the return completion position) when the positioning-motion control section 38 decelerates the spindle axis 12 from the current speed Vc' of inverse rotation (hereinafter described as a rotation number per second (unit thereof being represented as rev/sec)) at the aforementioned positioning deceleration Apos' of inverse rotation (negative value). The positioning return-rotation amount Spos' is determined, analogously to the aforementioned positioning rotation amount Spos, by the following equation 4:

$$|Sr'|=Vb'^2/(2\times|Apos'|)=Spos' \quad \text{equation 4}$$

If the residual return-rotation amount Sr' at an instant when the spindle axis 12 reaches the intermediate return-speed Vb' is equal to the positioning return-rotation amount Spos' of the spindle axis 12, the correspondence between the residual return-rotation amount (i.e., the current position) Sr', the current speed Vc' (rev/sec) and the current deceleration Ac' (rev/sect), of the spindle axis 12 during the time period T8, is represented by the following equation:

$$|Ac'|=(Vc'^2-Vb'^2)/(2\times(Sr'-Spos'))$$

based on a formula:

$$Vc'^2-Vb'^2=2\times|Ac'|\times(Sr'-Spos')$$

In the time period T8 (step S16), the spindle-axis control section 18 (the decelerating-motion control section 52) constantly monitors the residual return-rotation amount Sr' and the current speed Vc' of inverse rotation of the spindle axis 12, and determines a new or updated velocity command Cv' by subtracting a value obtained by multiplying the aforementioned current deceleration Ac' by a velocity-command updating cycle Tctl (sec) from the current speed Vc' (i.e., the last velocity command Cv'). The velocity command Cv' is represented by the following equation 5:

$$Cv'=Vc'-Ac'\times Tctl \quad \text{equation 5}$$

According to the equation 5, the decelerating-motion control section 52 successively updates the velocity command Cv' in the velocity-command updating cycle Tctl. The spindle axis 12 performs the decelerated inverse rotation while gradually increasing the deceleration Ac' in accordance with the successively updated velocity command Cv', during the operation from the point C to the point D, and reaches the point D at an instant when being decelerated to the intermediate return-speed Vb' (FIG. 5).

Turning back to FIG. 4, at step S17, the spindle-axis control section 18 (the positioning-motion control section 38) judges whether the absolute value |Sr'| of the residual return-rotation amount Sr' of the spindle axis 12 satisfies the equation 4: $|Sr'|=Vb'^2/(2\times|Apos'|)$ (i.e., whether or not the rotational position of the spindle axis 12 has reached the point D). If the equation 4 is satisfied, the spindle-axis control section 18 (the positioning-motion control section 38) prepares, at step S18, a movement command for making the spindle axis 12 perform the decelerated inverse rotation at the positioning deceleration Apos' and stop at the point of Sr'=0 (i.e., the return completion position), and executes a position control for the spindle axis 12 with use of the prepared movement command. If the equation 4 is not satisfied, the judgment at step S17 is repeated until the equation 4 is satisfied. The spindle axis 12 performs, in accordance with the movement command from the spindle-axis control section 18 (the positioning-motion control section 38), the return motion from the point D toward the return completion position, by performing the decelerated inverse rotation at the positioning deceleration Apos', and reaches and stops at the return completion position when Sr' becomes equal to zero. In this way, in time period T9 (FIG. 5) in which the spindle axis operates from the point D to reach the return completion position, the spindle-axis control section 18 executes a position control for the spindle axis 12 (an exemplary velocity command at a constant acceleration, obtained from the movement command, is depicted by a broken line).

At aforementioned step S14, if the spindle-axis control section 18 (the current-speed detecting section 36) judges that the current speed Vc' of inverse rotation has reached the maximum return-rotation speed V0', the control flow goes to step S19 instead of step S15. The spindle-axis control section 18 (the residual rotation-amount detecting section 34) stores, at step S19, a rotation amount (i.e., a rotational position FBS) of the spindle axis 12 from the target thread depth at an instant when the spindle axis reaches the maximum return-rotation speed V0', as an acceleration rotation amount Sa' of the return motion. Then, at step S20, the spindle-axis control section 18 (the residual rotation-amount detecting section 34) judges whether the residual return-rotation amount Sr' is equal to or less than the acceleration rotation amount Sa'. If "Sr'" is equal to or less than "Sa'", the control flow goes to step S16, and subsequently executes steps S17 and S18, so as to perform the return motion until the return completion position. If "Sr'" is not equal to or not less than "Sa'", the judgment at step S20 is repeated until "Sr'" becomes equal to or less than "Sa'".

Referring now to FIG. 6, one example of the return motion of the spindle axis 12, in the case where the current speed Vc' of inverse rotation reaches the maximum return-rotation speed V0' before the residual return-rotation amount Sr' reaches one-half of the total return-rotation amount S0' (i.e., in the case where the judgment result at step S14 is No), is depicted by a speed-time curve (the curve below a time axis). As depicted in FIG. 6, the accelerated inverse rotation of the spindle axis 12 at maximum capacity at step S12 is performed during time periods T6 and T7, and the maximum acceleration A0' of inverse rotation is detected during a constant acceleration in time period T6 (i.e., a time period from a point when the spindle axis starts at the target thread depth to a point when the spindle axis reaches the intermediate return-speed Vb'). When the rotational speed of the spindle axis 12 exceeds the intermediate return-speed Vb'

(the base speed of the spindle motor 12M, in this example), the acceleration of the spindle axis 12 gradually decreases from the maximum acceleration A0' due to the characteristics of the spindle motor 12M. The current speed Vc' of the spindle axis 12 reaches the maximum return-rotation speed V0' before the residual return-rotation amount Sr' reaches one-half of the total return-rotation amount S0', and thereafter, the spindle axis 12 inversely rotates at the constant speed V0' (i.e., null acceleration) over time period T10 so as to continue the return motion. At a time point C when the residual return-rotation amount Sr' becomes equal to the acceleration rotation amount Sa' (i.e., when the judgment result at step S20 becomes YES), the motion of the spindle axis 12 changes from the accelerated inverse rotation to the decelerated inverse rotation. Then, in time period T8 (step S16), the spindle axis 12 performs the aforementioned decelerated inverse rotation while gradually increasing the deceleration Ac' (by the velocity control), and in time period T9 (step S18), the spindle axis 12 performs the decelerated inverse rotation at the positioning deceleration Apos'. The spindle axis 12 reaches and stops at the return completion position when "Sr'" becomes equal to zero. In the time periods T6, T7, T8 and T9, the spindle axis 12 operates in the same manner as the motion depicted in FIG. 5.

In the motion examples depicted in FIGS. 5 and 6, during a period when the spindle-axis control section 18 controls the inverse rotational (or return) motion of the spindle axis 12 from the target thread depth to the return completion position, the feed-axis control section 22 (FIG. 2) executes a feedback control for the feed axis 14 so as to make the feed axis perform an inverse feed motion while following the motion of the spindle axis 12, with use of the rotational position FBS of the spindle axis 12. During a period when the spindle-axis control section 18 executes the processes from step S11 to step S20, the numerical control section 16 monitors the residual return-rotation amount Sr' notified from the spindle-axis control section 18, and judges that the return motion is completed and the tool has been pulled out from the workpiece when the residual return-rotation amount Sr' becomes equal to or less than a second predetermined value (a very small value close to zero).

Figure 7:
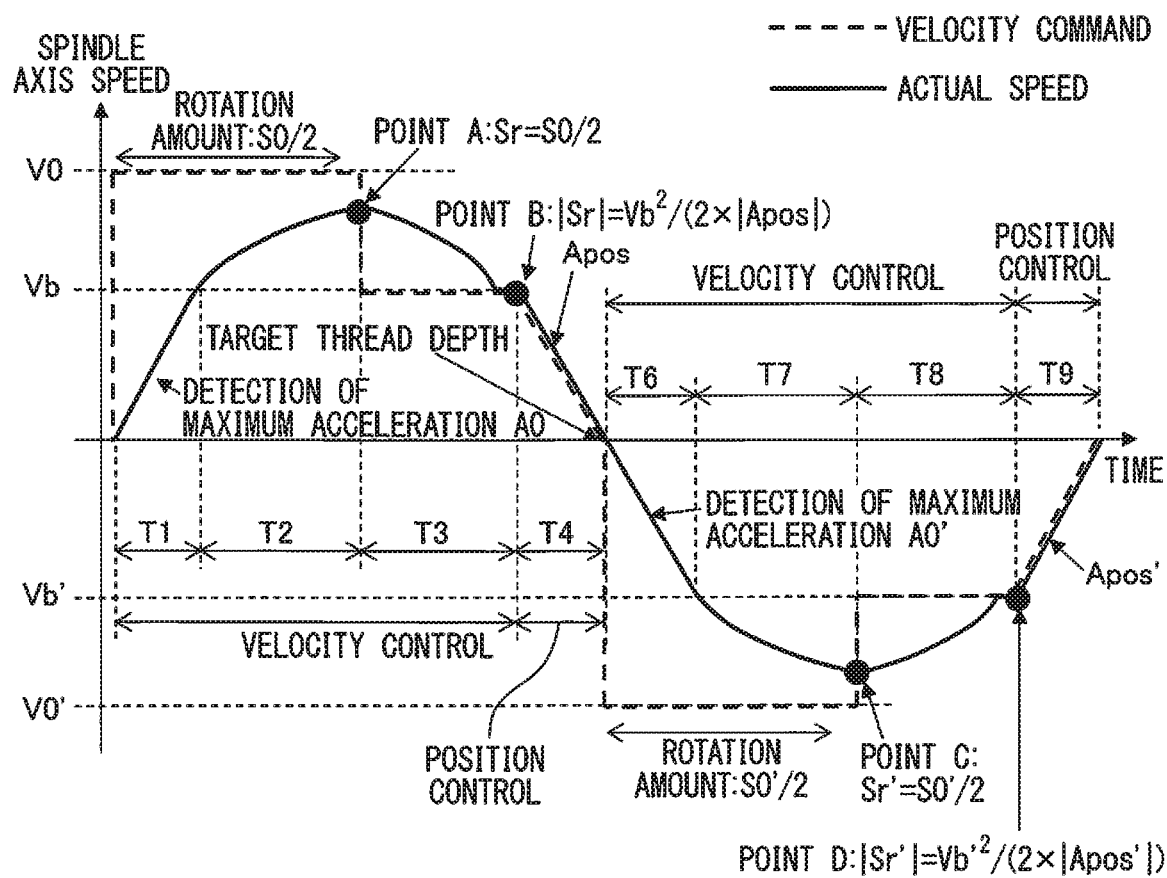
FIG. 7 is a diagram depicting yet another example of the motion of a spindle axis, achieved in the embodiment of FIGS. 2-4.
Figure 8:
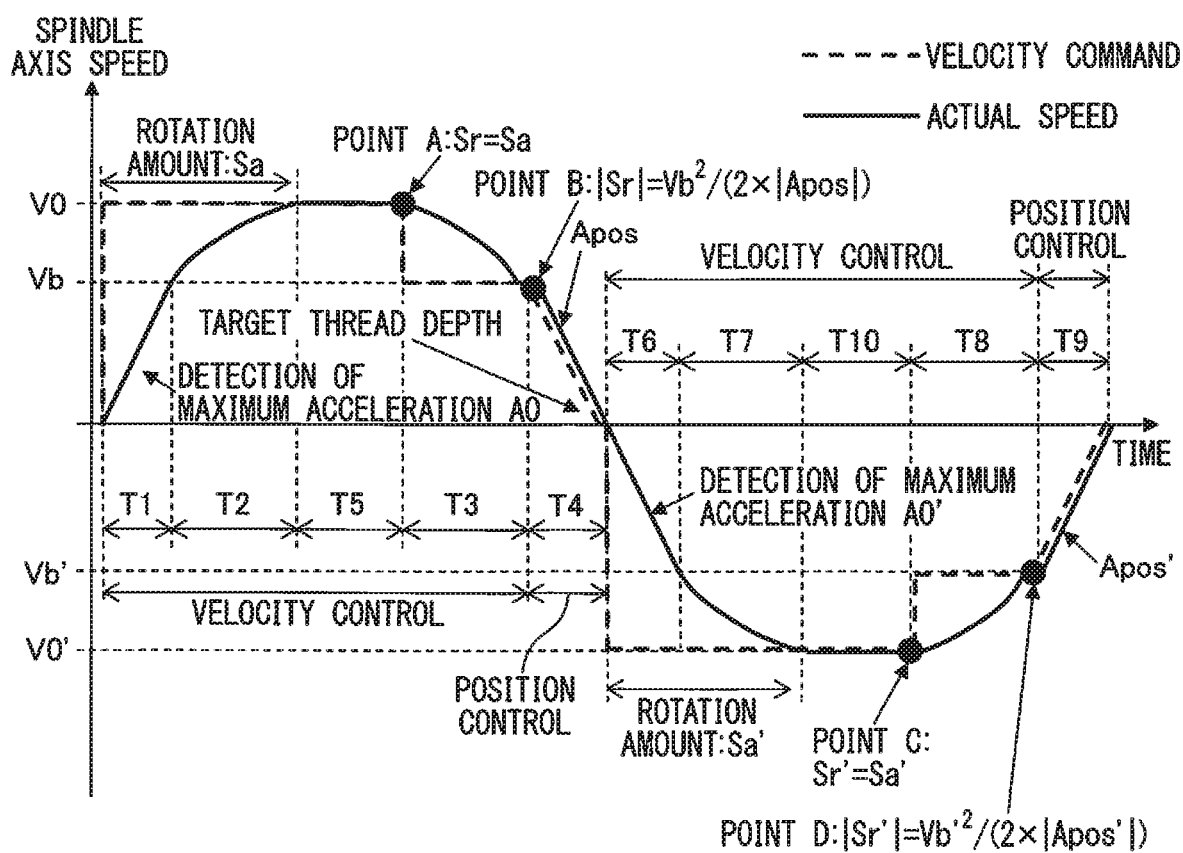
FIG. 8 is a diagram depicting a further example of the motion of a spindle axis, achieved in the embodiment of FIGS. 2-4.

In the motion examples depicted in FIGS. 5 and 6, the controller 50 is configured to execute, after the accelerated rotation at maximum capacity of the spindle axis 12, the velocity control so as to make the spindle axis 12 perform the decelerated rotation (or the decelerated inverse rotation) at the gradually increasing deceleration Ac (or Ac') from the point A (or C) by the successively updated velocity command Cv (or Cv'), so that the residual rotation amount Sr (or the residual return-rotation amount Sr') of the spindle axis 12 when reaching the intermediate speed Vb (or the intermediate return-speed Vb') becomes equal to the positioning rotation amount Spos (or the positioning return-rotation amount Spos'). In place of the above velocity control during the decelerated rotation (or the decelerated inverse rotation), the controller 50 may also be configured to execute a velocity control so as to make the spindle axis 12 perform a decelerated rotation (or a decelerated inverse rotation) at maximum capacity from the point A (or C) with an intermediate speed Vb (or an intermediate return-speed Vb') set as a target value. FIGS. 7 and 8 depict two different examples of motions of the spindle axis 12, achieved by a control method to make the spindle axis 12 perform a decelerated rotation (or a decelerated inverse rotation) at maximum capacity from the point A (or C). The configuration of making the spindle axis 12 perform a maximum deceleration by a velocity control will be described below with reference to FIGS. 7 and 8 together with FIGS. 2-4.

Referring to FIG. 7, one example of the cutting motion of the spindle axis 12, in the case where the residual rotation amount Sr reaches one-half of the total rotation amount S0 before the current speed Vc reaches the maximum rotation speed V0 (i.e., in the case where the judgment results at respective steps S4 and S5 in FIG. 3 are YES), as well as one example of the return motion of the spindle axis 12, in the case where the residual return-rotation amount Sr' reaches one-half of the total return-rotation amount S0' before the current speed Vc' of inverse rotation reaches the maximum return-rotation speed V0' (i.e., in the case where the judgment results at respective steps S14 and S15 in FIG. 4 are YES), are depicted by a speed-time curve. On the other hand, referring to FIG. 8, one example of the cutting motion of the spindle axis 12, in the case where the current speed Vc reaches the maximum rotation speed V0 before the residual rotation amount Sr reaches one-half of the total rotation amount S0 (i.e., in the case where the judgment result at step S4 in FIG. 3 is No), as well as one example of the return motion of the spindle axis 12, in the case where the current speed Vc' of inverse rotation reaches the maximum return-rotation speed V0' before the residual return-rotation amount Sr' reaches one-half of the total return-rotation amount S0' (i.e., in the case where the judgment result at step S14 in FIG. 4 is No), are depicted by a speed-time curve. The motion of the spindle axis 12 in the time periods T1, T2, T4-T7, T9 and T10, depicted in FIGS. 7 and 8, are similar to the motion of the spindle axis 12 in the time periods T1, T2, T4-T7, T9 and T10, depicted in FIGS. 5 and 6.

During the time period T3 depicted in FIGS. 7 and 8, the spindle-axis control section 18 (the decelerating-motion control section 52) executes a velocity control to make the spindle axis 12 perform a decelerated rotation at maximum capacity using the maximum permissible current of a drive source (spindle motor 12M) from the point A with the intermediate speed Vb set as a target value. During the decelerated rotation at maximum capacity, the deceleration of the spindle axis 12 gradually increases due to the characteristics of the spindle motor 12M. In this connection, it is assumed that a torque necessary for acceleration of the spindle axis 12 (hereinafter referred to as an acceleration torque) is equal to a torque necessary for deceleration of the spindle axis 12 (hereinafter referred to as a deceleration torque). In general, mechanical load (or resistance) arises during the rotation of the spindle axis 12 and thus the acceleration torque becomes larger than the deceleration torque. Therefore, if the acceleration torque is equal to the deceleration torque, a time required for the acceleration at maximum capacity becomes longer than a time required for the deceleration at maximum capacity provided that the changes of speed thereof correspond to each other. Accordingly, the spindle axis 12 decelerating from the point A reaches the intermediate speed Vb in a time period shorter than the time period T2, and the position |Sr| of that time is represented by:

$$|Sr| > Vc^2/(2 \times |Apos|)$$

and thereafter, the spindle axis 12 rotates at the constant intermediate speed Vb for a very short time, so as to reach the point B represented by:

$$|Sr| = Vb^2/(2 \times |Apos|)$$

(see FIGS. 7 and 8).

In an analogous manner, during the time period T8 depicted in FIGS. 7 and 8, the spindle-axis control section 18

(the decelerating-motion control section 52) executes a velocity control to make the spindle axis 12 perform a decelerated inverse rotation at maximum capacity using the maximum permissible current of a drive source (spindle motor 12M) from the point C with the intermediate return-speed Vb' set as a target value. During the decelerated inverse rotation at maximum capacity, the deceleration of inverse rotation of the spindle axis 12 gradually increases due to the characteristics of the spindle motor 12M. In the same manner as the aforementioned motion immediately before the point B, the spindle axis 12 decelerating from the point C reaches the intermediate return-speed Vb' in a time period shorter than the time period T7, and the position |Sr'| of that time is represented by:

$$|Sr'|>Vc^2/(2\times|Apos'|)$$

and thereafter, the spindle axis 12 rotates at the constant intermediate return-speed Vb' for a very short time, so as to reach the point D represented by:

$$|Sr'|=Vb^2/(2\times|Apos'|)$$

(see FIGS. 7 and 8).

As described above, the controller 50 has a configuration wherein, when the spindle axis 12 performs the return motion (rotational motion) from the target thread depth (starting position) to the return completion position (target position), the numerical control section 16 instructs only the total return-rotation amount S0' and the maximum return-rotation speed V0', of the spindle axis 12, as the spindle axis command CS to the spindle-axis control section 18, and the spindle-axis control section 18 performs, in accordance with the spindle axis command CS, the return motion by inversely accelerating the spindle axis 12 with the maximum power using the maximum permissible current, aiming at the maximum return-rotation speed V0', and continuously performs, based on the maximum acceleration A0' of inverse rotation detected during the maximum accelerated rotation as well as the sequentially detected residual return-rotation amount Sr' and current speed Vc' of the spindle axis 12, the return motion until the return completion position while inversely decelerating the spindle axis 12, so as to make the spindle axis reach the return complete position. Therefore, according to the controller 50, it is no longer necessary to perform a parameter setting or adjustment, etc., required for the numerical control section 16 to prepare acceleration and deceleration commands in conformity with the power characteristics of the spindle axis 12, and it is possible, with a simple configuration, to reduce the cycle time of the tapping process by executing an acceleration and deceleration control so as to maximize the acceleration capacity of the spindle axis 12.

Further, the controller 50 is configured so that, during a period when the spindle axis 12 is decelerated by the position control to reach the return completion position after acceleration, the spindle axis 12 performs the decelerated inverse rotation at the positioning deceleration Apos' of inverse rotation higher than a deceleration corresponding to the maximum acceleration A0' (A0'<|Apos'|≤|Amax'|) while taking into account the mechanical loss of the drive source (spindle motor 12M). Therefore, according to the controller 50, it is possible to improve the aforementioned effect of reducing the cycle time of the tapping process.

In the configurations of the embodiments depicted in FIGS. 2 to 8, it is premised that the maximum rotation speed V0 of the spindle axis 12 is higher than the base speed of the spindle motor 12M (i.e., the intermediate speed Vb). In contrast, in some machine tool configurations, the maximum rotation speed V0 of the spindle axis 12 may be lower than the base speed (Vb) of the spindle motor 12M. In this case, time periods T2 and T3 in the motion examples depicted in FIGS. 5-8 are omitted, and the spindle axis 12 operates at a constant acceleration and deceleration from the process start position to the target thread depth. The controller 10 depicted in FIG. 1 is capable of controlling a cutting and return motion of the spindle axis 12, in the case where the maximum rotation speed V0 of the spindle axis 12 is lower than the base speed (Vb) of the spindle motor 12M, as one embodiment of a machine tool control method. The illustrated machine tool control method has a configuration in which steps S6 and S7 in the flowchart of FIG. 3 as well as steps S16 and S17 in the flowchart of FIG. 4 are omitted. Two different examples of the cutting motion of the spindle axis 12, executable by the controller 10, will be described below with reference to FIGS. 9 and 10 together with FIGS. 1 and 3.

Figure 9:
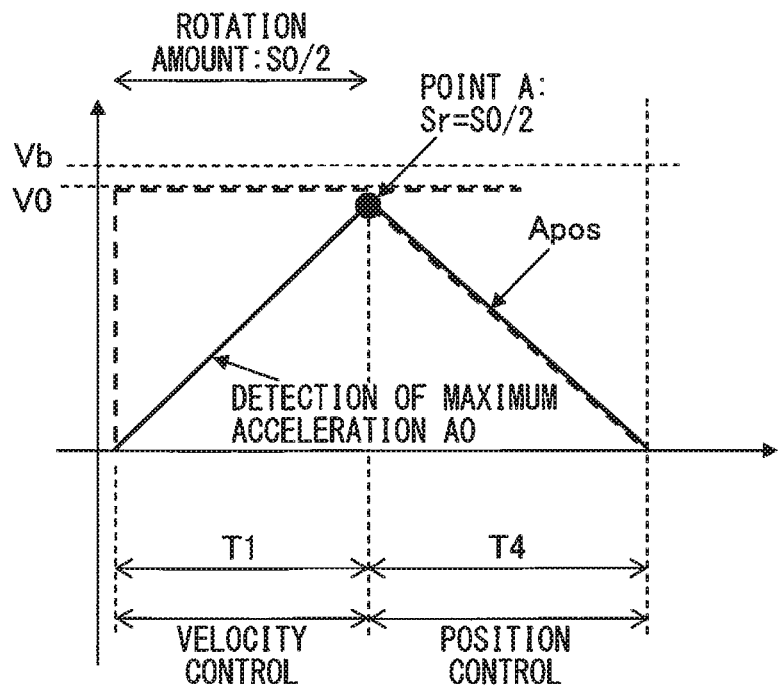
FIG. 9 is a diagram depicting one example of the motion of a spindle axis, achieved in the embodiment of FIG. 1.

FIG. 9 depicts one example of the cutting motion of the spindle axis 12 by a speed-time curve, in the case where the residual rotation amount Sr reaches one-half of the total rotation amount S0 before the current speed Vc reaches the maximum rotation speed V0 (<Vb) (i.e., in the case where the judgment results at steps S4 and S5 of FIG. 3 are YES). As illustrated, the spindle axis 12 performs only the motions in the time periods T1 and T4 depicted in FIG. 5. More specifically, the spindle axis 12 performs, in the time period T1, the accelerated rotation at the maximum acceleration A0 with the maximum rotation speed V0 set as a target value, and at the time point A when Sr reaches one-half of S0, shifts from the accelerated rotation to the decelerated rotation, and thereafter performs, in the time period T4, the decelerated rotation at the positioning deceleration Apos from the point A to the target thread depth (the residual rotation amount Sr is equal to zero). During a period when the spindle axis 12 performs the decelerated rotation, the spindle-axis control section 18 (the positioning-motion control section 38 (FIG. 1)) executes only a position control for the spindle axis 12.

Figure 10:
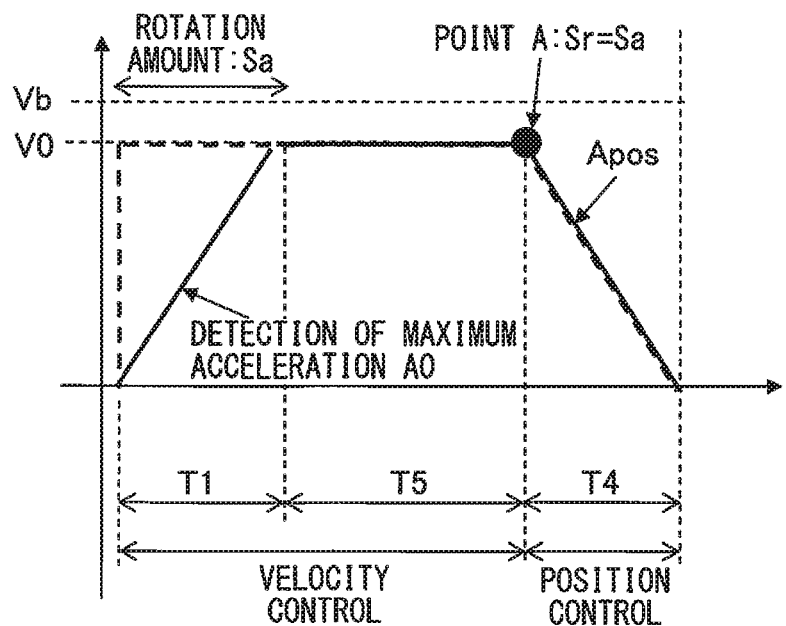
FIG. 10 is a diagram depicting another example of the motion of a spindle axis, achieved in the embodiment of FIG. 1.

FIG. 10 depicts another example of the motion of the spindle axis 12 by a speed-time curve, in the case where the current speed Vc reaches the maximum rotation speed V0 (<Vb) before the residual rotation amount Sr reaches one-half of the total rotation amount S0 (i.e., in the case where the judgment result at step S3 of FIG. 3 is No). As illustrated, the spindle axis 12 performs only the motions in the time periods T1, T5 and 14 depicted in FIG. 6. More specifically, the spindle axis 12 performs, in the time period T1, the accelerated rotation at the maximum acceleration A0 with the maximum rotation speed V0 set as a target value, and after reaching the maximum rotation speed V0, rotates in the time period T5 at the constant speed V0 until the point A when the residual rotation amount Sr becomes equal to the acceleration rotation amount Sa, and thereafter performs, in the time period 14, the decelerated rotation at the positioning deceleration Apos from the point A to the target thread depth (the residual rotation amount Sr is equal to zero). During a period when the spindle axis 12 performs the constant speed rotation and the decelerated rotation, the spindle-axis control section 18 (the positioning-motion control section 38 (FIG. 1)) executes only a position control for the spindle axis 12.

In the motion examples depicted in FIGS. 9 and 10, during a period when the spindle-axis control section 18 controls the rotational (or cutting) motion of the spindle axis 12 from the process start position to the target thread depth, the feed-axis control section 22 (FIG. 1) executes a feedback control for the feed axis 14 so as to make the feed axis perform a feed motion while following the motion of the spindle axis 12, with use of the rotational position FBS of the spindle axis 12. Note that the controller 10 is capable of controlling the return motion of the spindle axis 12 with a procedure corresponding to that of the cutting motion depicted in FIGS. 9 and 10, and also capable of controlling the inverse feed motion of the feed axis 14.

According to the controller 10, analogously to the aforementioned controller 50, it is no longer necessary to perform a parameter setting or adjustment, etc., required for the numerical control section 16 to prepare acceleration and deceleration commands in conformity with the power characteristics of the spindle axis 12, and it is possible, with a simple configuration, to reduce the cycle time of the tapping process by executing an acceleration and deceleration control so as to maximize the acceleration capacity of the spindle axis 12. Further, the controller 10 is configured so that, during a period when the spindle axis 12 is decelerated by the position control to reach the target thread depth (or the return completion position) after acceleration, the spindle axis 12 performs the decelerated rotation (or the decelerated inverse rotation) at the positioning deceleration Apos (or the positioning deceleration Apos' of inverse rotation) higher than a deceleration corresponding to the maximum acceleration A0 (A0<|Apos|≤|Amax|) (or the maximum acceleration A0' of inverse rotation (A0'<|Apos'|≤|Amax'|)) while taking into account the mechanical loss of the drive source (spindle motor 12M). Therefore, according to the controller 10, it is possible to improve the aforementioned effect of reducing the cycle time of the tapping process.

Figure 11:
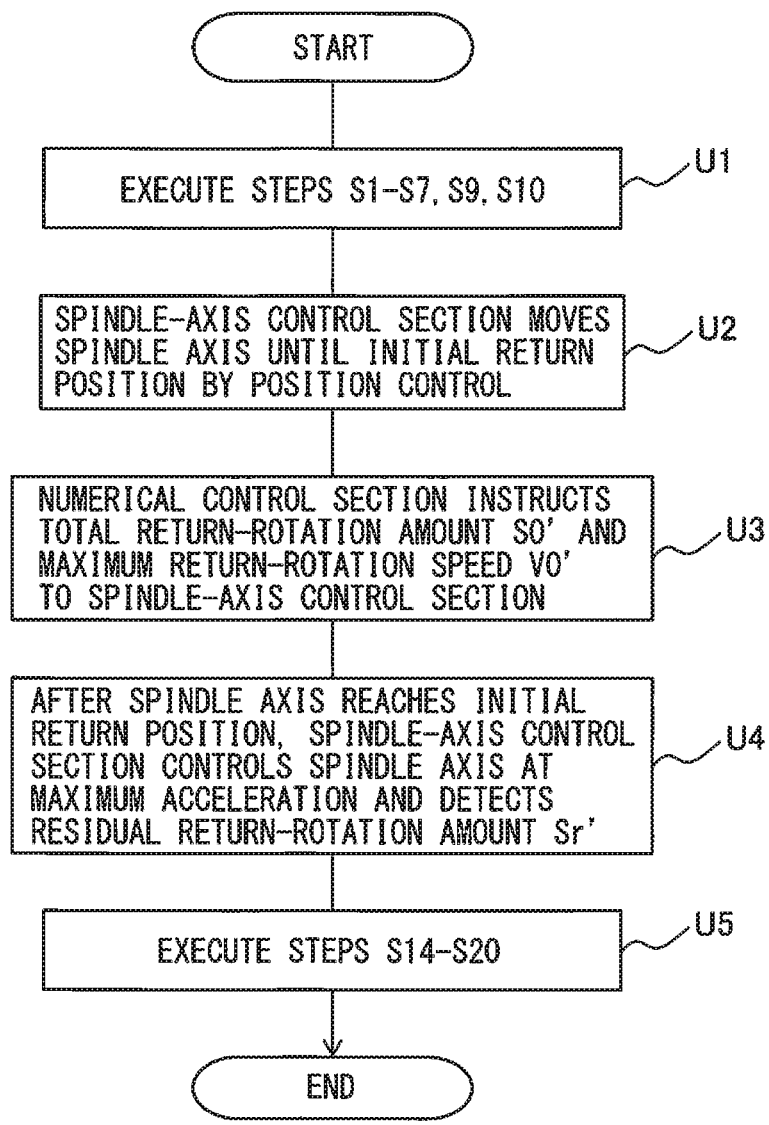
FIG. 11 is a flowchart depicting a cutting and return motion control method for a tapping process, in a second embodiment of a machine tool control method.

The controllers 10 and 50 depicted in FIGS. 1 and 2 are capable of executing a machine tool control method different from the aforementioned machine tool control method. FIG. 11 depicts a cutting and return motion control method configured to be performed for the spindle axis 12 in a tapping process, as the second embodiment of a machine tool control method executable by the controller 50. FIGS. 12 to 15 correspond respectively to FIGS. 5 to 8, and depict four examples of the cutting and return motion of the spindle axis 12 in the embodiment of FIG. 11. With reference to FIGS. 2-4 and 11-15, the machine tool control method (i.e., the cutting and return motion control method in the tapping process) of the second embodiment, as well as the configuration of the controller 50 executing this method, will be described below.

In summary, in the second embodiment depicted in FIGS. 11 to 15, the controller 50 executes several steps analogous to the steps in the cutting motion control method of the tapping process depicted in FIG. 3, and thereby controls the cutting motion of the spindle axis 12, during a period when the spindle axis 12 is moved from the process start position to the target thread depth. On the other hand, the spindle-axis control section 18 (the positioning-motion control section 38) of the controller 50 is configured not to make the spindle axis 12 stop at the target thread depth (i.e., not to set the acceleration to zero) at an instant when the spindle axis 12 reaches the target thread depth, but to make the spindle axis 12 perform, by a position control, an accelerated inverse rotation at an acceleration Apos of inverse rotation (negative value), which corresponds to the positioning deceleration Apos (negative value), until a rotational position (hereinafter referred to as an initial return position) at which the spindle axis has returned by a predetermined rotation number from the target thread depth. After making the spindle axis 12 perform the accelerated inverse rotation until the initial return position, the controller 50 executes several steps analogous to the steps in the return motion control method of the tapping process depicted in FIG. 4, and thereby controls the return motion of the spindle axis 12. The configuration of the second embodiment will be described in detail below. However, the description of components corresponding to those in the flowcharts of FIGS. 3 and 4 will be omitted as appropriate.

As depicted in FIG. 11, the controller 50 first executes, at step U1, the processes of steps S1 to S7, S9 and S10 depicted in FIG. 3. More specifically, the numerical control section 16 (the spindle-axis command outputting section 26) instructs the total rotation amount S0 and the maximum rotation speed V0, of the spindle axis 12, to the spindle-axis control section 18 (step S1). The spindle-axis control section 18 (the initial-motion control section 30, the maximum-acceleration detecting section 32 and the residual rotation-amount detecting section 34) makes the spindle axis 12 perform the accelerated rotation at maximum capacity to perform the cutting motion from the process start position, with the maximum rotation speed V0 set as a target speed, and detects the maximum acceleration A0 and the residual rotation amount Sr during the accelerated rotation (step S2). Next, the spindle-axis control section 18 (the positioning-motion control section 38) calculates the positioning deceleration Apos higher than a deceleration corresponding to the maximum acceleration A0 and equal to or lower than the maximum deceleration Amax (step S3). Thereafter, the spindle-axis control section 18 (the current-speed detecting section 36) sequentially detects the current speed Vc during the accelerated rotation at maximum capacity, and judges whether the current speed Vc has not reached the maximum rotation speed V0 (step S4). If Vc has not yet reached V0, the spindle-axis control section 18 (the decelerating-motion control section 52) judges whether the residual rotation amount Sr is equal to or less than one-half of the total rotation amount S0 (step S5). If Sr is equal to or less than one-half of S0, the spindle-axis control section 18 (the decelerating-motion control section 52) executes a velocity control to make the spindle axis 12 perform the decelerated rotation until the intermediate speed Vb so as to continuously perform the cutting motion (step S6). On the other hand, if it is judged that the current speed Vc has reached the maximum rotation speed V0 (step S4), the spindle-axis control section 18 (the residual rotation-amount detecting section 34) stores a rotation amount (i.e., a rotational position FBS) of the spindle axis 12 from the process start position at an instant when the spindle axis reaches the maximum rotation speed V0, as an acceleration rotation amount Sa (step S9), and judges whether the residual rotation amount Sr is equal to or less than the acceleration rotation amount Sa (step S10). If Sr is equal to or less than Sa, the spindle-axis control section 18 (the decelerating-motion control section 52) executes the velocity control to make the spindle axis 12 perform the decelerated rotation until the intermediate speed Vb so as to continuously perform the cutting motion (step S6). Thereafter, the spindle-axis control section 18 (the positioning-motion control section 38) judges whether the residual rotation amount Sr of the spindle axis 12 at the current position satisfies the equation 2: $|Sr|=Vb^2/(2\times|Apos|)$ (step S7).

Figure 12:
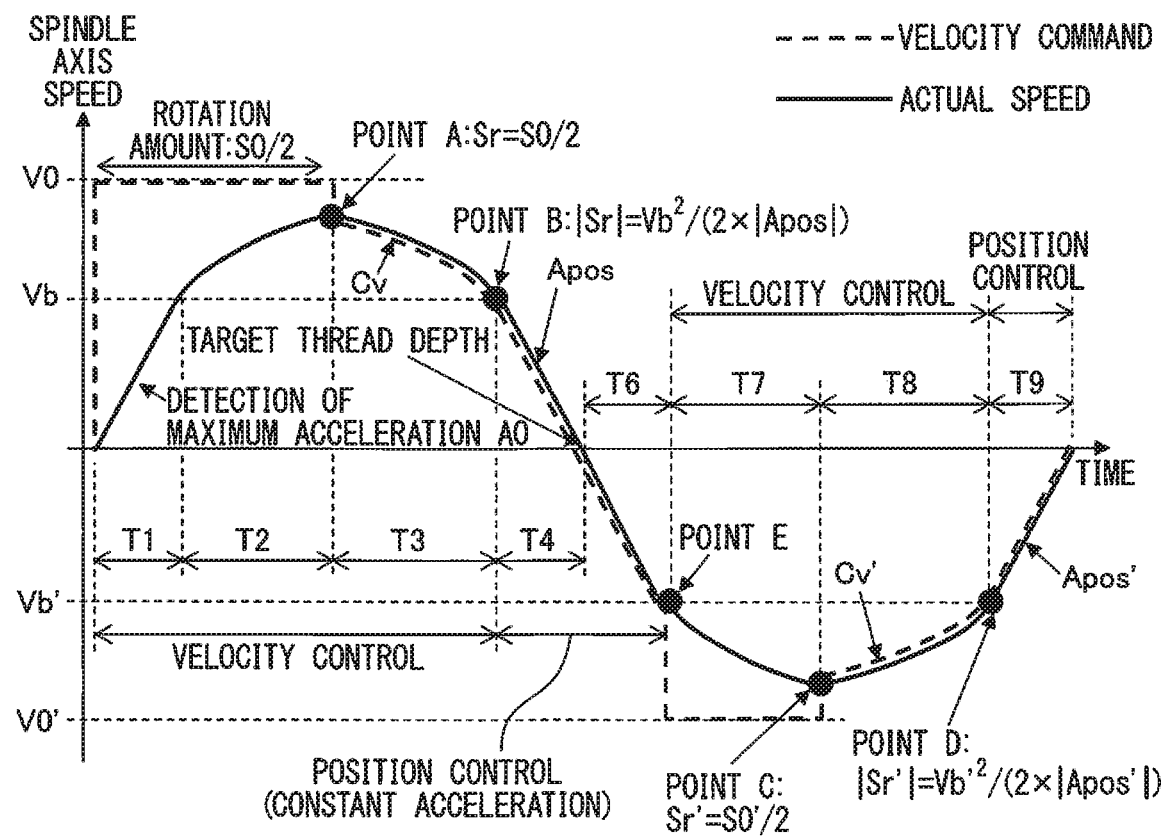
FIG. 12 is a diagram depicting one example of the motion of a spindle axis, achieved in the embodiments of FIGS. 2 and 11.

Referring now to FIG. 12, one example of the cutting motion of the spindle axis 12, in the case where the residual rotation amount Sr reaches one-half of the total rotation amount S0 before the current speed Vc reaches the maximum rotation speed V0 during the cutting motion at step U1 of FIG. 11 (i.e., in the case where the judgment results at respective steps S4 and S5 of FIG. 3 are YES), is depicted by a speed-time curve (the curve above a time axis). The motions of the spindle axis 12 in time periods T1, T2, T3 and T4 in the speed-time curve of FIG. 12 correspond to the motions of the spindle axis 12 in time periods T1, T2, T3 and T4 in the aforementioned speed-time curve of FIG. 5. More specifically, as depicted in FIG. 12, the accelerated rotation of the spindle axis 12 at maximum capacity (by a velocity control) is performed during the time periods T1 and T2; then at the time point A when the residual rotation amount Sr reaches one-half of the total rotation amount S0 (i.e., when the judgment result at step S5 of FIG. 3 becomes YES), the motion of the spindle axis 12 changes from the accelerated rotation to the decelerated rotation; thereafter, the decelerated rotation of the spindle axis 12 at gradually increasing deceleration Ac (by a velocity control) is performed in the time period T3; and thereafter, the decelerated rotation of the spindle axis 12 at the positioning deceleration Apos (by a position control) is performed in the time period T4.

With the execution of step U1 (i.e., steps S1 to S2 to S3 to S4 to S5 to S6 of FIG. 3 in this order) by the controller 50, the spindle axis 12 operates, in the time periods T1, T2 and T3 depicted in FIG. 12, in the same way as the operation in the time periods T1, T2 and T3 depicted in FIG. 5 as described above. If the spindle-axis control section 18 (the positioning-motion control section 38) judges that the residual rotation amount Sr of the spindle axis 12 satisfies the aforementioned equation 2 at step U1 (step S7 of FIG. 3), the spindle-axis control section 18 (the positioning-motion control section 38) prepares, at step U2 of FIG. 11 instead of step S8 of FIG. 3, a movement command for making the spindle axis 12 perform the decelerated rotation at the positioning deceleration Apos so as to reach the point of Sr=0 (i.e., the target thread depth) and subsequently perform an accelerated inverse rotation until the initial return position (i.e., time point E depicted in FIG. 12) at an acceleration Apos of inverse rotation, identical or corresponding to the positioning deceleration Apos, and executes a position control for the spindle axis 12 with use of the prepared movement command.

Turning back to FIG. 12, the spindle axis 12 performs, in accordance with the movement command from the spindle-axis control section 18 (the positioning-motion control section 38), the cutting motion from the point B toward the target thread depth while performing the decelerated rotation at the positioning deceleration Apos, and reaches the target thread depth when Sr becomes equal to zero (in the time period T4). At the moment the spindle axis 12 reaches the target thread depth, the current speed Vc of the spindle axis 12 becomes equal to zero, but the spindle axis 12 further operates, in accordance with the movement command from the spindle-axis control section 18 (the positioning-motion control section 38), to maintain the positioning deceleration Apos and generate the acceleration Apos of inverse rotation, and performs a return motion from the target thread depth toward the initial return position (point E) over the time period T6 by the accelerated inverse rotation for gradually increasing the current speed Vc (negative value). In this way, in the time period 14 in which the spindle axis operates from the point B to reach the target thread depth and in the time period T6 in which the spindle axis operates from the target thread depth to reach the point E, the spindle-axis control section 18 executes a position control for the spindle axis 12 (step U2) and continuously moves the spindle axis 12 at a constant acceleration (i.e., the positioning deceleration Apos and the acceleration Apos of inverse rotation) (an exemplary velocity command at the constant acceleration, obtained from the movement command, is depicted by a broken line). Note that, although the current speed Vc of the spindle axis 12 becomes zero at the target thread depth, this is a momentary phenomenon, and thus should not be considered as to stop at the target thread depth.

The initial return position (point E) of the spindle axis 12 can be set arbitrarily. For example, as depicted in FIG. 12, the point E may be set at a position at which the current speed Vc' of inverse rotation of the spindle axis 12 reaches the intermediate return-speed Vb', in the same way as the point B at which the decelerated rotation at the positioning deceleration Apos (by the position control) starts during the cutting motion. In this configuration, the position of the point E is considered as a position where the spindle axis 12 reaches by performing the inverse rotation from the target thread depth by a rotation amount corresponding to $|Sr|=Vb^2/(2\times|Apos|)$.

Figure 13:
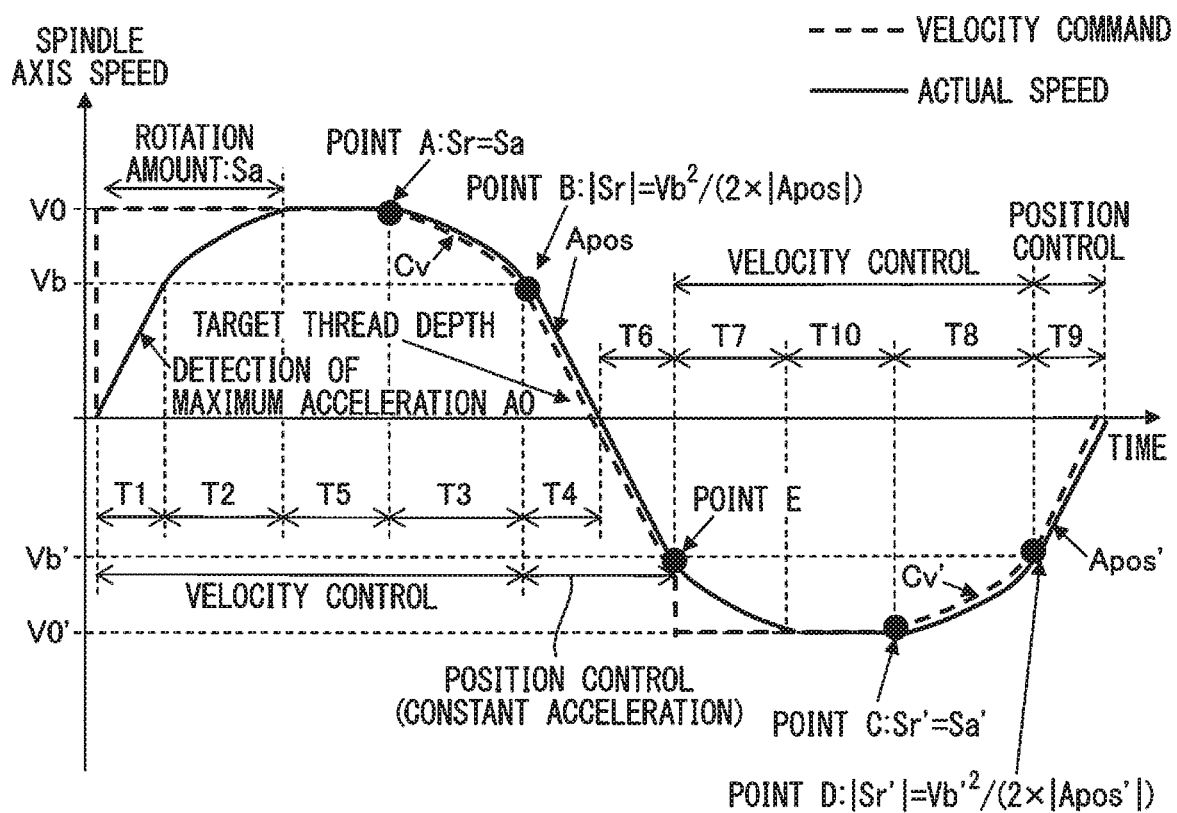
FIG. 13 is a diagram depicting another example of the motion of a spindle axis, achieved in the embodiments of FIGS. 2 and 11.

Referring now to FIG. 13, one example of the cutting motion of the spindle axis 12, in the case where the current speed Vc reaches the maximum rotation speed V0 before the residual rotation amount Sr reaches one-half of the total rotation amount S0 during the cutting motion at step U1 of FIG. 11 (i.e., in the case where the judgment result at step S4 of FIG. 3 is NO), is depicted by a speed-time curve (the curve above a time axis). The motions of the spindle axis 12 in time periods T1, T2, T5, T3 and T4 in the speed-time curve of FIG. 13 correspond to the motions of the spindle axis 12 in time periods T1, T2, T5, T3 and T4 in the aforementioned speed-time curve of FIG. 6. More specifically, as depicted in FIG. 13, the accelerated rotation of the spindle axis 12 at maximum capacity (by a velocity control) is performed during the time periods T1 and T2, so that the current speed Vc of the spindle axis 12 reaches the maximum rotation speed V0; thereafter, the spindle axis 12 rotates at the constant speed V0 over the time period T5 so as to continue the cutting motion; then at the time point A when the residual rotation amount Sr becomes equal to the acceleration rotation amount Sa (i.e., when the judgment result at step S10 of FIG. 3 becomes YES), the motion of the spindle axis 12 changes from the accelerated rotation to the decelerated rotation; thereafter, the decelerated rotation of the spindle axis 12 at gradually increasing deceleration Ac (by a velocity control) is performed in the time period T3; and thereafter, the decelerated rotation of the spindle axis 12 at the positioning deceleration Apos (by a position control) is performed in the time period T4.

With the execution of step U1 (especially, steps S1 to S2 to S3 to S4 to S9 to S10 to S6 in FIG. 3 in this order) by the controller 50, the spindle axis 12 operates, in the time periods T1, T2, T5 and T3 depicted in FIG. 13, in the same way as the operation in the time periods T1, T2, T5 and T3 depicted in FIG. 6 as described above. If the spindle-axis control section 18 (the positioning-motion control section 38) judges that the residual rotation amount Sr of the spindle axis 12 satisfies the aforementioned equation 2 at step U1 (step S7 of FIG. 3), the spindle-axis control section 18 (the positioning-motion control section 38) prepares, at step U2 of FIG. 11 instead of step S8 of FIG. 3, a movement command for making the spindle axis 12 perform the decelerated rotation at the positioning deceleration Apos so as to reach the point of Sr=0 (i.e., the target thread depth) and subsequently perform an accelerated inverse rotation until the initial return position (i.e., time point E depicted in FIG. 13) at an acceleration Apos of inverse rotation, identical or corresponding to the positioning deceleration Apos, and executes a position control for the spindle axis 12 with use of the prepared movement command. The motions of the spindle axis 12 in the time periods T4 and T6 in the motion example of FIG. 13 are analogous to the motions of the spindle axis 12 in the time periods T4 and T6 in the motion example of FIG. 12.

In the motion examples depicted in FIGS. 12 and 13, during a period when the spindle-axis control section 18 controls the rotational motion of the spindle axis 12 from the process start position to the target thread depth, the feed-axis control section 22 controls the feed axis 14 so as to perform a feed motion while following the motion of the spindle axis 12, with use of the rotational position FBS of the spindle axis 12. During a period when the spindle-axis control section 18 executes the aforementioned processes of step U1 and step U2, the numerical control section 16 monitors the residual rotation amount Sr notified from the spindle-axis control section 18, and judges that the tapping process has reached the target thread depth when the residual rotation amount Sr becomes equal to or less than a first predetermined value (a very small value close to zero). Then, the numerical control section 16 (the spindle-axis command outputting section 26) obtains, after it is judged that the tapping process has reached the target thread depth, the total return-rotation amount S0' and the maximum return-rotation speed V0', of the spindle axis 12, during a period when the spindle axis operates from the target thread depth to the return completion position, from a command value provided in the tapping program P interpreted by the program interpreting section 24, and sends the total return-rotation amount S0' and the maximum return-rotation speed V0' as the spindle axis command CS to the spindle-axis control section 18, at step U3 (FIG. 11) and concurrently with step U2.

After the spindle axis 12 has reached the initial return position (point E), the spindle-axis control section 18 (the initial-motion control section 30) makes, at step U4 (FIG. 11), the spindle axis 12 perform an accelerated inverse rotation at maximum capacity using the maximum permissible current of the drive source (spindle motor 12M), from the initial return position (point E) toward the return completion position, with the maximum return-rotation speed V0' set as a target speed, so as to perform the return motion. The spindle-axis control section 18 (the residual rotation-amount detecting section 34) sequentially detects a residual return-rotation amount Sr' of the spindle axis 12 during a period when the spindle axis operates from a current position to the return completion position, based on the total return-rotation amount S0' and the rotational position FBS. The spindle-axis control section 18 notifies the detected residual return-rotation amount Sr' to the numerical control section 16 every time it is detected. In this embodiment, the maximum-acceleration detecting section 32 does not detect a maximum acceleration of inverse rotation of the spindle axis 12 during the time period T6, but obtains the positioning deceleration Apos in the decelerated rotation during the time period T4 as an acceleration of inverse rotation of the spindle axis 12 performing the accelerated inverse rotation from the target thread depth.

Next, the controller 50 executes, at step U5 (FIG. 11), the processes of steps S14 to S20 depicted in FIG. 4. More specifically, the spindle-axis control section 18 (the current-speed detecting section 36) sequentially detects the current speed Vc' of inverse rotation based on the rotational position FBS during the accelerated inverse rotation at maximum capacity, and judges whether the current speed Vc' has not reached the maximum return-rotation speed V0' (step S14). If Vc' has not reached V0', the spindle-axis control section 18 judges whether the residual return-rotation amount Sr' is equal to or less than one-half of the total return-rotation amount S0' (step S15). If Sr' is equal to or less than one-half of S0', the spindle-axis control section 18 makes the spindle axis 12 perform the decelerated inverse rotation until the intermediate return-speed Vb' so as to continuously perform the return motion (step S16). On the other hand, if it is judged that the current speed Vc' has reached the maximum return-rotation speed V0' (step S14), the spindle-axis control section 18 (the residual rotation-amount detecting section 34) stores a rotation amount of the spindle axis 12 from the target thread depth (i.e., a rotational position FBS) at an instant when the spindle axis reaches the maximum return-rotation speed V0', as the acceleration rotation amount Sa' of the return motion (step S19), and judges whether the residual return-rotation amount Sr' is equal to or less than the acceleration rotation amount Sa' (step S20). If Sr' is equal to or less than Sa', the spindle-axis control section 18 (the decelerating-motion control section 52) makes the spindle axis 12 perform the decelerated inverse rotation until the intermediate return-speed Vb' so as to continuously perform the return motion (step S16).

Next, the spindle-axis control section 18 (the positioning-motion control section 38) judges whether the residual return-rotation amount Sr' of the spindle axis 12 at the current position satisfies the equation 4: $|Sr'|=Vb'^2/(2\times |Apos'|)$ (step S17). If the equation 4 is satisfied, the spindle-axis control section 18 (the positioning-motion control section 38) prepares a movement command for making the spindle axis 12 perform the decelerated inverse rotation at the positioning deceleration Apos' (corresponding to the acceleration Apos of inverse rotation in the time period T6) and stop at the point of Sr'=0 (i.e., the return completion position), and executes a position control for the spindle axis 12 with use of the prepared movement command (step S18). The spindle axis 12 performs the return motion toward the return completion position, in accordance with the movement command from the spindle-axis control section 18 (the positioning-motion control section 38), by performing the decelerated inverse rotation at maximum deceleration A0', and reaches and stops at the return completion position when Sr' becomes equal to zero.

Referring now to FIG. 12, one example of the return motion of the spindle axis 12, in the case where the residual return-rotation amount Sr' reaches one-half of the total return-rotation amount S0' before the current speed Vc' of inverse rotation reaches the maximum return-rotation speed V0' at step U5 of FIG. 11 (i.e., in the case where the judgment results at respective steps S14 and S15 of FIG. 4 are YES), is depicted by a speed-time curve (the curve below a time axis). The motions of the spindle axis 12 in time periods T7, T8 and T9 in the speed-time curve of FIG. 12 correspond to the motions of the spindle axis 12 in time periods T7, T8 and T9 in the aforementioned speed-time curve of FIG. 5. In the motion example of FIG. 12, after the spindle axis 12 moves from the target thread depth to reach the initial return position (point E) during the time period T6, the current speed Vc' of inverse rotation of the spindle axis 12 exceeds the intermediate return-speed Vb' (negative value), so that the acceleration of inverse rotation of the spindle axis 12 in the accelerated inverse rotation at maximum capacity gradually decreases from the acceleration Apos due to the characteristics of the spindle motor 12M (in the time period T7). At a time point C when the residual return-rotation amount Sr' reaches one-half of the total return-rotation amount S0' (i.e., when the judgment result at step S15 of FIG. 4 becomes YES), the motion of the spindle axis 12 changes from the accelerated inverse rotation to the decelerated inverse rotation; thereafter, the decelerated inverse rotation of the spindle axis 12 at gradually increasing deceleration Ac' (by a velocity control) is performed in the time period T8; and thereafter, the decelerated inverse rotation of the spindle axis 12 at the positioning deceleration Apos' (by a position control) is performed in the time period T9.

On the other hand, referring to FIG. 13, one example of the return motion of the spindle axis 12, in the case where the current speed Vc' of inverse rotation reaches the maximum return-rotation speed V0' before the residual return-rotation amount Sr' reaches one-half of the total return-rotation amount S0' at step U5 of FIG. 11 (i.e., in the case where the judgment result at step S14 of FIG. 4 is NO), is depicted by a speed-time curve (the curve below a time axis). The motions of the spindle axis 12 in time periods T7, T10, T8 and T9 in the speed-time curve of FIG. 13 correspond to the motions of the spindle axis 12 in time periods T7, T10, T8 and T9 in the aforementioned speed-time curve of FIG. 6. In the motion example of FIG. 13, during the time period T7 after the spindle axis 12 reaches the initial return position (point E), the accelerated inverse rotation of the spindle axis 12 at maximum capacity by the gradually decreasing acceleration (≤Apos) is performed in a way similar to the motion example of FIG. 12, so that the current speed Vc' of inverse rotation of the spindle axis 12 reaches the maximum return-rotation speed V0'. Thereafter, the spindle axis 12 inversely rotates at the constant speed V0' over the time period T10 so as to continue the return motion. At a time point C when the residual return-rotation amount Sr' becomes equal to the acceleration rotation amount Sa' (i.e., when the judgment result at step S20 of FIG. 4 becomes YES), the motion of the spindle axis 12 changes from the accelerated inverse rotation to the decelerated inverse rotation; thereafter, the decelerated inverse rotation of the spindle axis 12 at gradually increasing deceleration Ac' (by a velocity control) is performed in the time period T8; and thereafter, the decelerated inverse rotation of the spindle axis 12 at the positioning deceleration Apos' (by a position control) is performed in the time period T9.

In the motion examples depicted in FIGS. 12 and 13, during a period when the spindle-axis control section 18 controls the inverse rotational motion of the spindle axis 12 from the target thread depth to the return completion position, the feed-axis control section 22 controls the feed axis 14 so as to perform an inverse feed motion while following the motion of the spindle axis 12, with use of the rotational position FBS of the spindle axis 12. During a period when the spindle-axis control section 18 executes the aforementioned processes from step U3 to step U5, the numerical control section 16 monitors the residual return-rotation amount Sr' notified from the spindle-axis control section 18, and judges that the return motion is completed and the tool has been pulled out from the workpiece when the residual return-rotation amount Sr' becomes equal to or less than a second predetermined value (a very small value close to zero).

Figure 14:
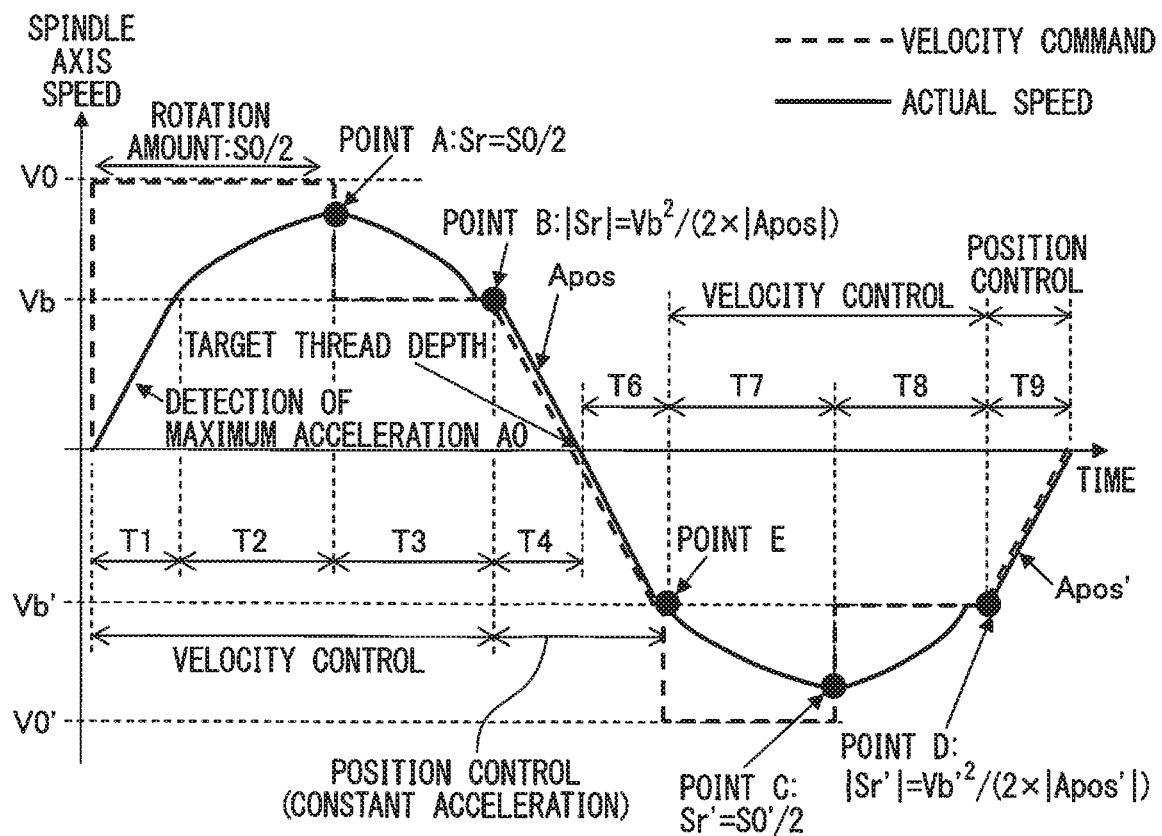
FIG. 14 is a diagram depicting yet another example of the motion of a spindle axis, achieved in the embodiments of FIGS. 2 and 11.
Figure 15:
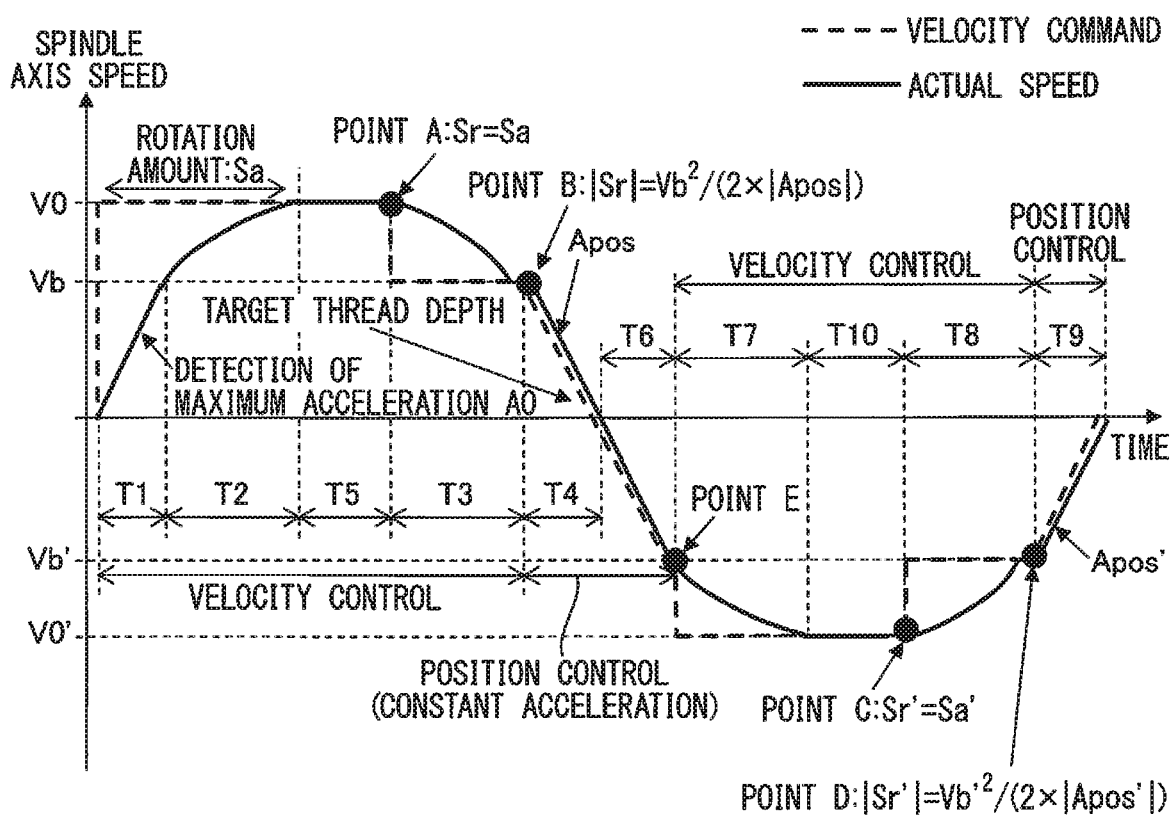
FIG. 15 is a diagram depicting a further example of the motion of a spindle axis, achieved in the embodiments of FIGS. 2 and 11.

FIGS. 14 and 15 depict two different examples of motions of the spindle axis 12, achieved by a control method to make the spindle axis 12 perform a decelerated rotation (or a decelerated inverse rotation) at maximum capacity from the point A (or C), which are analogous to the aforementioned motion examples depicted in FIGS. 7 and 8. The motions of the spindle axis 12 in the time periods T1, T2, T4-T7, T9 and T10, depicted in FIGS. 14 and 15, are similar to the motions of the spindle axis 12 in the time periods T1, T2, T4-T7, T9 and T10, depicted in FIGS. 12 and 13. In the time period T3 depicted in FIGS. 14 and 15, the spindle axis 12 decelerates from the point A and then reaches the intermediate speed Vb in a time period shorter than the time period T2, and thereafter, the spindle axis 12 rotates at the constant intermediate speed Vb for a very short time, so as to reach the point B. Analogously, in the time period T8 depicted in FIGS. 14 and 15, the spindle axis 12 decelerates from the point C and then reaches the intermediate return-speed Vb' in a time period shorter than the time period T7, and thereafter, the spindle axis 12 rotates at the constant intermediate return-speed Vb' for a very short time, so as to reach the point D.

In the controller 50 according to the embodiments depicted in FIGS. 11 to 15, it is no longer necessary to perform a parameter setting or adjustment, etc., required for the numerical control section 16 to prepare acceleration and deceleration commands in conformity with the power characteristics of the spindle axis 12, and it is possible, with a simple configuration, to reduce the cycle time of the tapping process by executing an acceleration and deceleration control so as to maximize the acceleration capacity of the spindle axis 12, analogously to the embodiments described with reference to FIGS. 3-8. Further, the controller 50 is configured so that, during a period when the spindle axis 12 is decelerated by the position control to reach the target thread depth (or the return completion position) after acceleration, the spindle axis 12 performs the decelerated rotation (or the decelerated inverse rotation) at the positioning deceleration Apos (or the positioning deceleration Apos' of inverse rotation) higher than a deceleration corresponding to the maximum acceleration A0 (A0<|Apos|≤|Amax|) (or A0<|Apos'|≤|Amax'|) while taking into account the mechanical loss of the drive source (spindle motor 12M). Therefore, according to the controller 50, it is possible to improve the aforementioned effect of reducing the cycle time of the tapping process.

Moreover, the controller 50 according to the embodiments depicted in FIGS. 11 to 15 has a configuration wherein, when the spindle axis 12 is made perform the return motion from the target thread depth to the return completion position, the spindle axis 12 is not made stop at the target thread depth (i.e., the acceleration is not set to zero) at the completion of the cutting motion, but is made perform the accelerated inverse rotation until the predetermined initial return position by the position control, at the acceleration Apos of inverse rotation equal to the positioning deceleration Apos. According to this configuration, a change in the acceleration of the spindle axis 12 at an instant when the operation of the spindle axis 12 is changed from the cutting motion to the return motion is eliminated, so that it is possible to avoid a mechanical or structural shock that may be caused on the spindle axis 12 due to the change in the acceleration as well as an increase of synchronization error that may be caused between the spindle axis 12 and the feed axis 14 due to the change in the acceleration.

Note that, the controller 10 depicted in FIG. 1 is capable of performing a control method analogous to the machine tool control method of the aforementioned second embodiment performed by the controller 50, except that the spindle axis 12 does not perform the decelerated (inverse) rotation by a velocity control, and thus achieves effects equivalent to those of the second embodiment.

The above-described configuration of the controller 10, 50 can be described as a machine tool control method for controlling a synchronized operation of the spindle axis 12 and the feed axis 14. The control method includes the steps, executed by the controller 10, 50, of:

obtaining, from a tapping program P, a total rotation amount S0 (or a total return-rotation amount S0') and a maximum rotation speed V0 (or a maximum return-rotation speed V0') of the spindle axis 12 during a period when the spindle axis operates from a starting position to a target position;

making the spindle axis 12 perform an accelerated rotation (or an accelerated inverse rotation) at maximum capacity using a maximum permissible current of a drive source (a spindle motor 12M) from the starting position, by a velocity control in which the maximum rotation speed V0 (or the maximum return-rotation speed V0') is set as a target value;

detecting a maximum acceleration A0 (or a maximum acceleration A0' of inverse rotation) of the spindle axis 12 during the accelerated rotation (or the accelerated inverse rotation) at maximum capacity, based on a rotational position feedback FBS of the spindle axis 12;

detecting a residual rotation amount Sr (or a residual return-rotation amount Sr') of the spindle axis 12 during a period when the spindle axis operates from a current position to the target position, based on the total rotation amount S0 (or the total return-rotation amount S0') and the rotational position feedback FBS;

detecting a current speed Vc (or a current speed Vc' of inverse rotation) of the spindle axis 12 based on the rotational position feedback FBS; and executing a position control for making the spindle axis 12 perform a decelerated rotation (or a decelerated inverse rotation) so as to reach the target position, based on the maximum acceleration A0 (or the maximum acceleration A0' of inverse rotation), the residual rotation amount Sr (or the residual return-rotation amount Sr') and the current speed Vc (or the current speed Vc' of inverse rotation), after the accelerated rotation (or the accelerated inverse rotation) at maximum capacity, wherein the step for making the spindle axis 12 reach the target position includes:

making the spindle axis 12 perform the decelerated rotation (or the decelerated inverse rotation) at a positioning deceleration Apos (or a positioning deceleration Apos' of inverse rotation) higher than a deceleration corresponding to the maximum acceleration A0 (or the maximum acceleration A0' of inverse rotation) and equal to or lower than a maximum deceleration Amax (or a maximum deceleration Amax' of inverse rotation) capable of compensating for a mechanical loss in the drive source (spindle motor 12M) during the decelerated rotation (or the decelerated inverse rotation) of the spindle axis 12.

According to the above control method, effects corresponding to those achieved by the aforementioned controller 10, 50 can be obtained.

While the embodiments of the disclosure have been described, it will be understood, by those skilled in the art, that various changes or modifications may be made thereto without departing from the scope of the following claims.

The invention claimed is:

1. A controller of a machine tool, configured to control a synchronized operation of a spindle axis and a feed axis, the controller comprising:

a numerical control section configured to prepare a spindle-axis command and a feed-axis command based on a tapping program;

a spindle-axis control section configured to control a rotational motion of the spindle axis in accordance with the spindle-axis command;

a rotation detecting section configured to detect a rotational position of the spindle axis; and a feed-axis control section configured to control a feed motion of the feed axis in accordance with the feed-axis command, based on the rotational position;

the numerical control section comprising:

a spindle-axis command outputting section configured to obtain, from the tapping program, a total rotation amount and a maximum rotation speed of the spindle axis during a period when the spindle axis operates from a starting position to a target position, and to send the total rotation amount and the maximum rotation speed as the spindle-axis command to the spindle-axis control section;

the spindle-axis control section comprising:

an initial-motion control section configured to make the spindle axis perform an accelerated rotation at maximum capacity using a maximum permissible current of a drive source from the starting position, by a velocity control in which the maximum rotation speed is set as a target value;

a maximum-acceleration detecting section configured to detect a maximum acceleration of the spindle axis during the accelerated rotation at maximum capacity, based on the rotational position;

a residual rotation-amount detecting section configured to detect a residual rotation amount of the spindle axis during a period when the spindle axis operates from a current position to the target position, based on the total rotation amount and the rotational position;

a current-speed detecting section configured to detect a current speed of the spindle axis based on the rotational position; and a positioning-motion control section configured to execute a position control for making the spindle axis perform a decelerated rotation so as to reach the target position, based on the maximum acceleration, the residual rotation amount and the current speed, after the accelerated rotation at maximum capacity, wherein the positioning-motion control section is configured to make the spindle axis perform the decelerated rotation at a positioning deceleration higher than a deceleration corresponding to the maximum acceleration and equal to a maximum deceleration capable of compensating for a mechanical loss in the drive source during the decelerated rotation of the spindle axis.

2. The controller of claim 1, wherein the positioning-motion control section includes a velocity-command calculating section configured to calculate a velocity command for making the spindle axis perform the decelerated rotation at the positioning deceleration.

3. The controller of claim 1, wherein the spindle-axis control section further comprises a decelerating-motion control section configured to execute a velocity control for making the spindle axis perform a decelerated rotation so as to reach a predetermined intermediate speed, after the accelerated rotation at maximum capacity and before starting the position control, and wherein the decelerating-motion control section is configured to successively update a velocity command for the decelerated rotation with use of the residual rotation amount and the current speed, and to make the spindle axis perform the decelerated rotation by the successively updated velocity command so that the residual rotation amount at an instant when the spindle axis reaches the intermediate speed becomes equal to a positioning rotation amount of the spindle axis required for the spindle axis to reach the target position under the position control.

4. The controller of claim 1, wherein the starting position corresponds to a process start position of a tapping process, and wherein the target position corresponds to a target thread depth of the tapping process.

5. The controller of claim 4, wherein the positioning-motion control section is configured to make the spindle axis stop at the target thread depth.

6. The controller of claim 4, wherein the positioning-motion control section is configured not to make the spindle axis stop at the target thread depth but to make the spindle axis perform, by a position control, an accelerated inverse rotation at an acceleration of inverse rotation, which corresponds to the positioning deceleration, to an initial return position at which the spindle axis has returned by a predetermined rotation number from the target thread depth, after the spindle axis reaches the target thread depth.

7. The controller of claim 1, wherein the starting position corresponds to a target thread depth of a tapping process, and wherein the target position corresponds to a return completion position of the tapping process.

8. A method of controlling a machine tool, configured to control a synchronized operation of a spindle axis and a feed axis, the method comprising the steps, executed by a controller, of:
obtaining, from a tapping program, a total rotation amount and a maximum rotation speed of the spindle axis during a period when the spindle axis operates from a starting position to a target position;
making the spindle axis perform an accelerated rotation at maximum capacity using a maximum permissible current of a drive source from the starting position, by a velocity control in which the maximum rotation speed is set as a target value;
detecting a maximum acceleration of the spindle axis during the accelerated rotation at maximum capacity, based on a rotational position feedback of the spindle axis;
detecting a residual rotation amount of the spindle axis during a period when the spindle axis operates from a current position to the target position, based on the total rotation amount and the rotational position feedback;
detecting a current speed of the spindle axis based on the rotational position feedback; and
executing a position control for making the spindle axis perform a decelerated rotation so as to reach the target position, based on the maximum acceleration, the residual rotation amount and the current speed, after the accelerated rotation at maximum capacity,
wherein the step of making the spindle axis reach the target position includes:
making the spindle axis perform the decelerated rotation at a positioning deceleration higher than a deceleration corresponding to the maximum acceleration and equal to a maximum deceleration capable of compensating for a mechanical loss in the drive source during the decelerated rotation of the spindle axis.

9. The method of claim 8, wherein the starting position corresponds to a process start position of a tapping process, and wherein the target position corresponds to a target thread depth of the tapping process.

10. The method of claim 9, wherein the spindle axis is stopped at the target thread depth.

11. The method of claim 9, wherein the spindle axis is not stopped at the target thread depth but performs, by a position control, an accelerated inverse rotation at an acceleration of inverse rotation, which corresponds to the positioning deceleration, to an initial return position at which the spindle axis has returned by a predetermined rotation number from the target thread depth, after the spindle axis reaches the target thread depth.

12. The method of claim 8, wherein the starting position corresponds to a target thread depth of a tapping process, and wherein the target position corresponds to a return completion position of the tapping process.

* * * * *